(12) United States Patent
Ogura et al.

(10) Patent No.: US 12,113,947 B2
(45) Date of Patent: Oct. 8, 2024

(54) IMAGE PROCESSING APPARATUS, IMAGE PROCESSING METHOD, AND PROGRAM FOR VIEWPOINT TRANSITION CONTROL

(71) Applicant: SONY GROUP CORPORATION, Tokyo (JP)

(72) Inventors: Sho Ogura, Kanagawa (JP); Yuya Yamashita, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 82 days.

(21) Appl. No.: 17/794,413

(22) PCT Filed: Jan. 26, 2021

(86) PCT No.: PCT/JP2021/002581
§ 371 (c)(1),
(2) Date: Jul. 21, 2022

(87) PCT Pub. No.: WO2021/161774
PCT Pub. Date: Aug. 19, 2021

(65) Prior Publication Data
US 2023/0060691 A1    Mar. 2, 2023

(30) Foreign Application Priority Data
Feb. 10, 2020  (JP) ................. 2020-020784

(51) Int. Cl.
*H04N 13/117*      (2018.01)
*G06F 3/14*        (2006.01)
*G06T 19/00*       (2011.01)

(52) U.S. Cl.
CPC ............. *H04N 13/117* (2018.05); *G06F 3/14* (2013.01); *G06T 19/003* (2013.01)

(58) Field of Classification Search
CPC .......... H04N 13/117; H04N 21/23614; H04N 21/42202; H04N 21/4318; H04N 21/4728;
(Continued)

(56) References Cited

U.S. PATENT DOCUMENTS

2006/0061567 A1\* 3/2006 Ouchi ..................... G06T 13/20
345/419
2012/0092348 A1\* 4/2012 Mccutchen ............... G06T 3/00
345/474
(Continued)

FOREIGN PATENT DOCUMENTS

JP      2016-194784 A    11/2016
JP      2018-139102 A     9/2018
WO   WO 2018/079166 A1   5/2018

*Primary Examiner* — Daniel F Hajnik
(74) *Attorney, Agent, or Firm* — Paratus Law Group, PLLC

(57) ABSTRACT

A display apparatus (10) that is an example of an image processing apparatus includes: an output unit that outputs part of an image including recommended viewpoint information as a display image to a display unit; and a transition control unit that causes the display range of the image to shift, on the basis of the positional relationship between the viewpoint position corresponding to the display image output to the display unit and the viewpoint position corresponding to the recommended viewpoint information. The output unit outputs part of the image to the display unit, on the basis of the display range that has been made to shift.

18 Claims, 17 Drawing Sheets

(58) Field of Classification Search
CPC ......... H04N 21/21805; H04N 21/4348; H04N 21/440245; H04N 21/816; G06F 3/14; G06F 3/011; G06F 3/012; G09G 5/36; G06T 19/003
See application file for complete search history.

(56) References Cited

U.S. PATENT DOCUMENTS

| | | | |
|---|---|---|---|
| 2014/0240318 A1* | 8/2014 | Coombe | G06T 19/003 345/427 |
| 2016/0356600 A1* | 12/2016 | Fan | G09B 29/10 |
| 2018/0150989 A1* | 5/2018 | Mitsui | H04N 23/632 |
| 2018/0307398 A1 | 10/2018 | Kim et al. | |

* cited by examiner

| (−180,90) | (180,90) |
|---|---|
| | (0,0) |
| (−180,−90) | (180,−90) | center of equirectangular is (0,0) degree

RECOMMENDED VIEWPOINT INFORMATION

FRAME NUMBER: frame number
CENTER ANGLE INFORMATION: centerAzimuth, centerElevation
HORIZONTAL ANGLE INFORMATION: cAzimuth1, cAzimuth2
VERTICAL ANGLE INFORMATION: cElevation1, cElevation2
RECOMMENDED VIEWPOINT NUMBER: id (IN CASE OF MULTI-CAMERA)

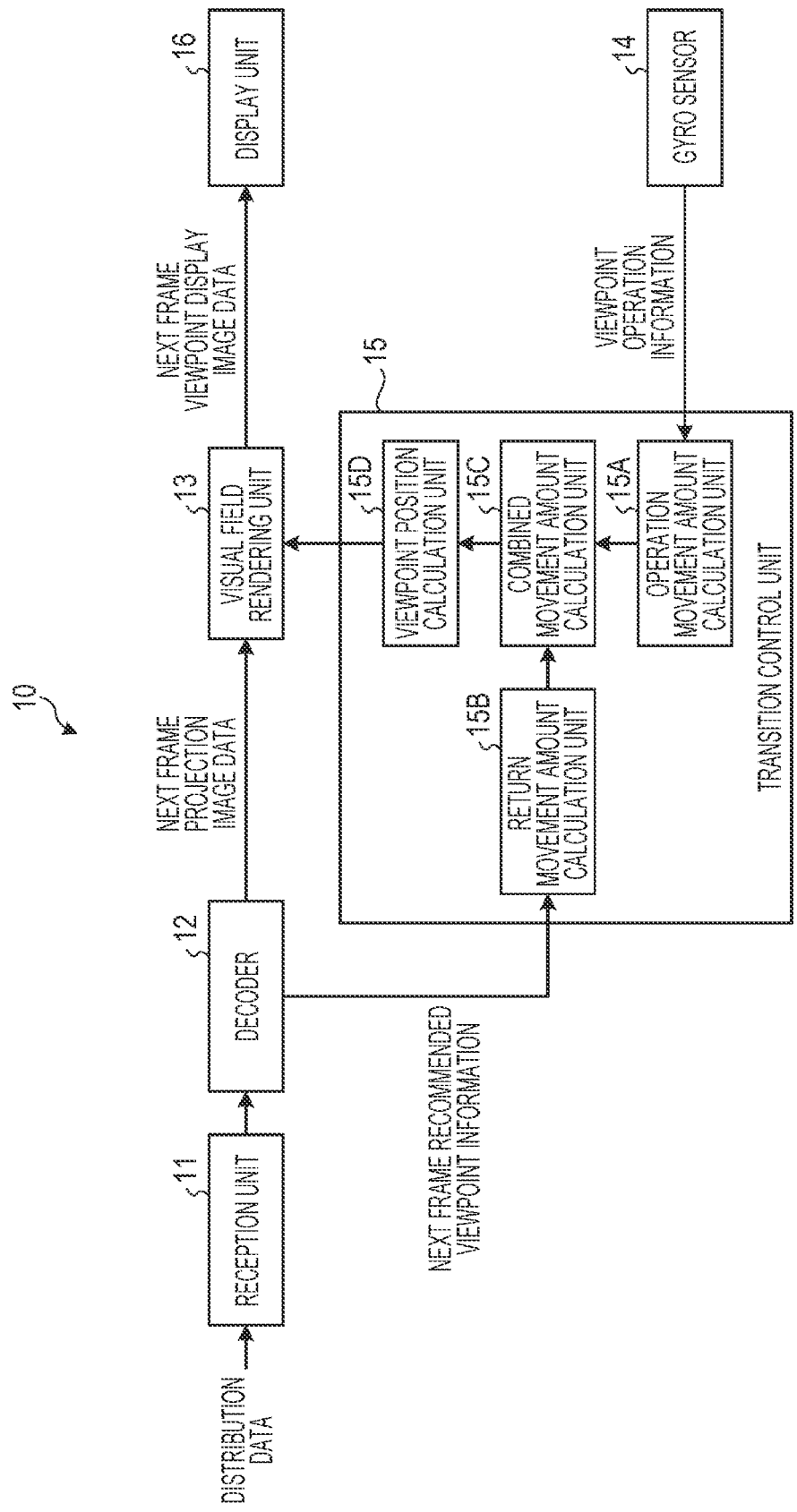

PROJECTION IMAGE

DISPLAY IMAGE

IMAGE PROCESSING APPARATUS, IMAGE PROCESSING METHOD, AND PROGRAM FOR VIEWPOINT TRANSITION CONTROL

CROSS REFERENCE TO PRIOR APPLICATION

This application is a National Stage Patent Application of PCT International Patent Application No. PCT/JP2021/002581 (filed on Jan. 26, 2021) under 35 U.S.C. § 371, which claims priority to Japanese Patent Application No. 2020-020784 (filed on Feb. 10, 2020), which are all hereby incorporated by reference in their entirety.

TECHNICAL FIELD

The present invention relates to an image processing apparatus, an image processing method, and a program.

BACKGROUND ART

The Omnidirectional Media Application Format (OMAF) standard of MPEG-DASH (Dynamic Adaptive Streaming over HTTP) defines a method for sending recommended viewpoint information together with data of a wide-viewing-angle image having an angle of view of 3600 or smaller. Also, Patent Document 1 discloses display of a recommended viewpoint, for example.

CITATION LIST

Patent Document

Patent Document 1: Japanese Patent Application Laid-Open No. 2016-194784

SUMMARY OF THE INVENTION

Problems to be Solved by the Invention

When the recommended viewpoint is displayed, only the recommended viewpoint is viewed in the wide-viewing-angle image. On the other hand, if the user can freely view the image, the user cannot see the recommended viewpoint position. In this case, it is conceivable to display the recommended viewpoint with a frame or the like, but the world depicted in the image might be shaken at that portion.

Therefore, the present disclosure aims to provide an image processing apparatus, an image processing method, and a program that enable combined use of a recommended viewpoint and a free viewpoint without displaying the position of the recommended viewpoint with a frame or the like.

Solutions to Problems

To solve the above problems, an image processing apparatus of an embodiment according to the present disclosure includes: an output unit that outputs part of an image including recommended viewpoint information as a display image to a display unit; and a transition control unit that causes the display range of the image to shift, on the basis of the positional relationship between the viewpoint position corresponding to the display image output to the display unit and the viewpoint position corresponding to the recommended viewpoint information. In the image processing apparatus, the output unit outputs part of the image to the display unit, on the basis of the display range that has been made to shift.

BRIEF DESCRIPTION OF DRAWINGS

FIG. 3 is a block diagram showing an example functional configuration of a display apparatus according to the first embodiment.

MODES FOR CARRYING OUT THE INVENTION

Figure 1:
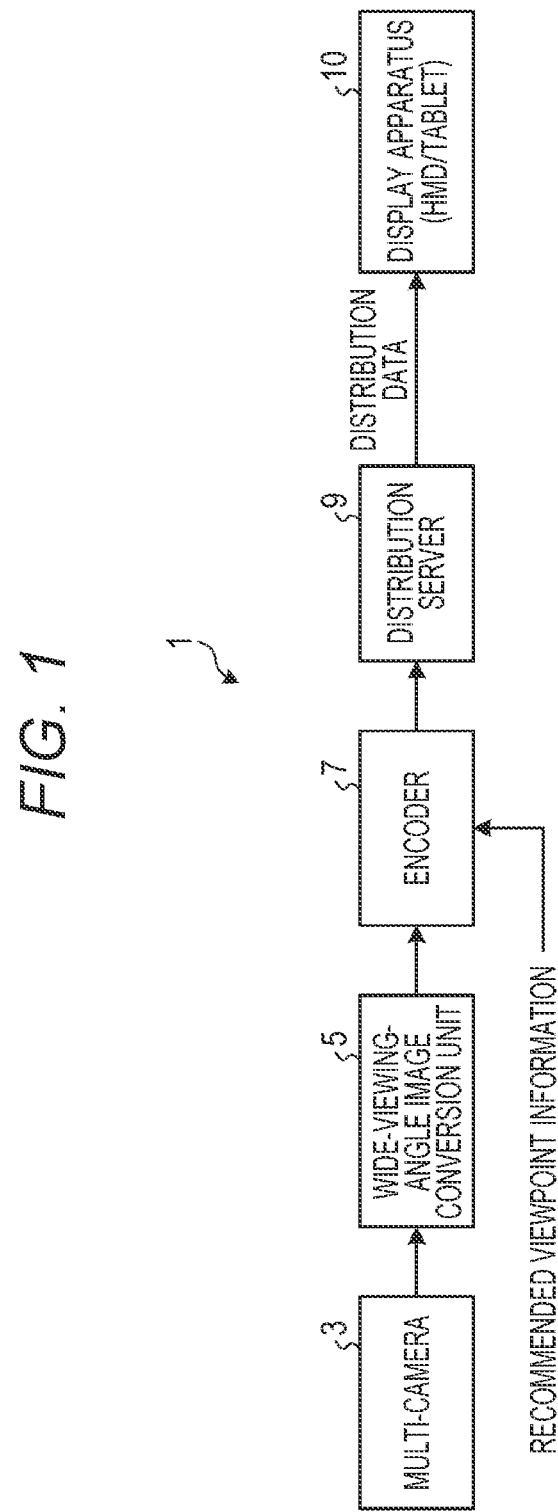
FIG. 1 is a diagram showing an example configuration of an image distribution system according to a first embodiment.

The following is a detailed description of embodiments of the present disclosure, with reference to the drawings. Note that, in each of the embodiments described below, the same components are denoted by the same reference numerals, and repetitive explanation of them will be avoided.

Also, the present disclosure will be explained in the following order.

1. First Embodiment
1-1. Image distribution system
1-2. Distributing-side apparatus
1-3. Receiving-side apparatus
1-3-1. Reception unit
1-3-2. Gyro sensor
1-3-3. Transition control unit
1-3-4. Visual field rendering unit
1-3-5. Display unit
1-4. Details of the transition control unit
1-4-1. Operation movement amount calculation unit
1-4-2. Return movement amount calculation unit
1-4-3. Combined movement amount calculation unit
1-4-4. Viewpoint position calculation unit
1-5. Processing procedures to be carried out by the display apparatus
1-6. One aspect of the effect
1-7. Example application of the first embodiment
1-7-1. Procedures in a process according to the example application
2. Second Embodiment
2-1. Example functional configuration of a display apparatus
2-2. Transition control unit
2-2-1. Correction unit
2-3. Processing procedures to be carried out by the display apparatus
2-4. One aspect of the effect
3. Third Embodiment
3-1. Example functional configuration of a display apparatus
3-2. Transition control unit
3-3. Processing procedures to be carried out by the display apparatus
3-4. One aspect of the effect
4. Fourth Embodiment
4-1. Example functional configuration of a display apparatus
4-2. Transition control unit
4-2-1. Score calculation unit
4-2-2. Recommended viewpoint selection unit
4-3. Processing procedures to be carried out by the display apparatus
4-4. One aspect of the effect
5. Modifications
5-1. Non-visual feedback
5-2. Conditions for execution of guidance control
5-3. Apparatus in which the functions are implemented
5-4. Other modifications
6. Hardware configuration 1. First Embodiment <1-1. Image Distribution System>

FIG. 1 is a diagram showing an example configuration of an image distribution system according to a first embodiment. As shown in FIG. 1, an image distribution system 1 includes a distributing-side apparatus and a display apparatus 10 as a receiving-side apparatus. Examples of installation of the display apparatus 10 include a head mounted display (HMD), a tablet, and the like.
<1-2. Distributing-Side Apparatus>
The distributing-side apparatus includes a multi-camera 3, a wide-viewing-angle image conversion unit 5, an encoder 7, and a distribution server 9.

The multi-camera 3 obtains image data of a spherical captured image. For example, the multi-camera 3 performs imaging with two cameras by a back-to-back method, and obtains a front-face image and a back-face image each having a wide viewing angle of 180° or greater captured as a spherical captured image with a fisheye lens.

The wide-viewing-angle image conversion unit 5 performs planar packing on the spherical captured image obtained by the multi-camera 3, and obtains a rectangular projection image (projection picture). This projection image corresponds to an image having a wide viewing angle that is an angle of view of 360° or smaller. In this case, equirectangular or the like is selected as the format type for the projection image, for example. Note that the wide-viewing-angle image conversion unit 5 performs scaling on the projection image as necessary, to obtain a projection image with a predetermined resolution.

The encoder 7 performs encoding, such as HEVC, for example, on the image data of the projection image supplied from the wide-viewing-angle image conversion unit 5 to obtain encoded image data, and generates a video stream containing the encoded image data. Here, the encoder 7 inserts recommended viewpoint information into the video stream frame by frame.

A recommended viewpoint (RVP) is automatically set in a range including a performer estimated by a position sensor or through image recognition, for example, or is set in a range manually designated by a director, for example. Here, only one recommended viewpoint is not necessarily set, but a plurality of recommended viewpoints may be set.

Figures 2A, 2B, 2C:
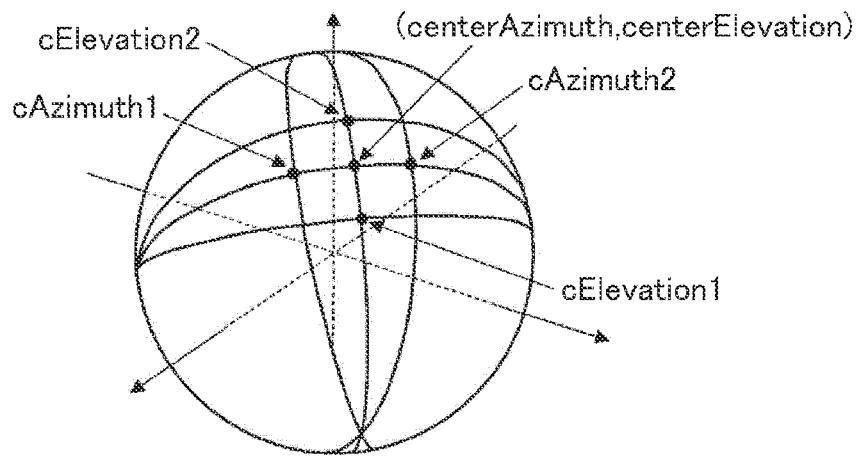
FIG. 2A is a diagram showing an example spherical surface corresponding to a spherical captured image.
FIG. 2B is a schematic diagram showing an example coordinate system of a projection image.
FIG. 2C is a diagram showing an example of recommended viewpoint information.

FIG. 2A shows a spherical surface corresponding to a spherical captured image. FIG. 2B schematically shows a rectangular projection image in a case where the format type is equirectangular. The center of this projection image is (0, 0).

The recommended viewpoint information includes a frame number, center angle information, azimuth angle information, elevation angle information, and a recommended viewpoint number, as shown in FIG. 2C, for example. The center angle information, the azimuth angle information, and the elevation angle information are the angle information in the spherical captured image (see FIG. 2A).

Referring back to FIG. 1, the distribution server 9 transmits the video stream generated by the encoder 7 as distribution data to the display apparatus 10. Note that this distribution may be either a broadcast or a communication.
<1-3. Receiving-Side Apparatus>
FIG. 3 is a block diagram showing an example functional configuration of the display apparatus according to the first embodiment. FIG. 3 schematically shows the blocks corresponding to the functions of the display apparatus 10. As shown in FIG. 3, the display apparatus 10 includes a reception unit 11, a decoder 12, a visual field rendering unit 13, a gyro sensor 14, a transition control unit 15, and a display unit 16. Note that the visual field rendering unit 13 corresponds to an example of the output unit.
<1-3-1. Reception Unit>
The reception unit 11 receives a video stream as distribution data transmitted from the transmission-side apparatus. The decoder 12 decodes the video stream received by the reception unit 11, to obtain a projection image (image data). The decoder 12 also obtains the recommended viewpoint information inserted for each frame in the received video stream.

<1-3-2. Gyro Sensor>

The gyro sensor 14 detects a change in rotation angle of an apparatus including the gyro sensor 14 therein, which is the display apparatus 10 in this case. Such a detection output may correspond to line-of-sight operation information, such as a change in the rotation angle of the display apparatus 10 causing the user wearing an HMD to rotate the neck or causing the user to rotate a tablet. Note that the present invention can also be applied in a use case where the user performs an operation such as swiping on a touch panel to generate a viewpoint operation. In that case, information about the operation on the touch panel may correspond to viewpoint operation information.

<1-3-3. Transition Control Unit>

The transition control unit 15 cause a transition the display range of the display image to be displayed on the display unit 16 in a projection image, on the basis of the recommended viewpoint information about the next frame from the decoder 12 and the viewpoint operation information from the gyro sensor 14. In an example, such a transition of the display range can be realized through calculation of the viewpoint position of the next frame for each frame. For example, with the viewpoint position of the next frame as the optical center, the transition control unit 15 can determine the display range of the next frame to be the field of view defined depending on the horizontal angle of view and the vertical angle of view, or on the diagonal angle of view, each of which is set as the size of a display image.

<1-3-4. Visual Field Rendering Unit>

From the projection image data of the next frame obtained by the decoder 12, the visual field rendering unit 13 cuts out and renders the image data of the display range of the next frame calculated by the transition control unit 15, and obtains display image data corresponding to the viewpoint position of the next frame.

<1-3-5. Display Unit>

The display unit 16 displays the image based on the display image data obtained for each frame by the visual field rendering unit 13.

Figure 4A:
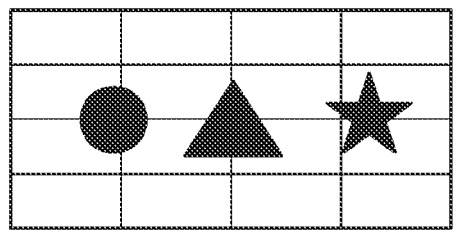
FIG. 4A is a diagram showing an example projection image.
Figure 4B:
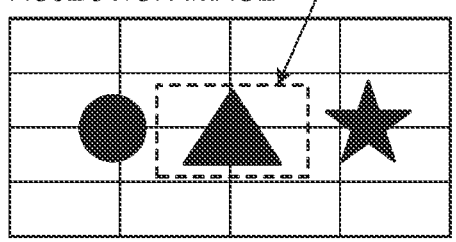
FIG. 4B is a diagram showing an example display range.
Figure 4C:
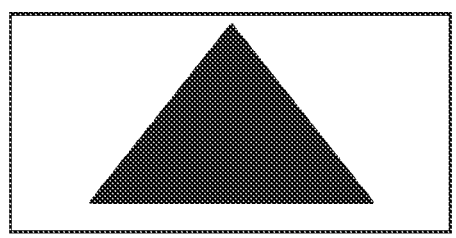
FIG. 4C is a diagram showing an example display image.

FIG. 4A is a diagram showing an example projection image. FIG. 4B is a diagram showing an example display range. FIG. 4C is a diagram showing an example display image. As shown in FIG. 4B, the display range of the next frame corresponding to the viewpoint position of the next frame is set on the projection image shown in FIG. 4A as merely an example. In a case where such a display range is set, the display image corresponding to the display range is cut out from the projection image, and is then displayed on the display unit 16 as shown in FIG. 4C.

<1-4. Details of the Transition Control Unit>

As shown in FIG. 3, the transition control unit 15 includes an operation movement amount calculation unit 15A, a return movement amount calculation unit 15B, a combined movement amount calculation unit 15C, and a viewpoint position calculation unit 15D.

<1-4-1. Operation Movement Amount Calculation Unit>

The operation movement amount calculation unit 15A is a processing unit that calculates the movement amount by which the viewpoint position corresponding to the display image is moved in accordance with the viewpoint operation based on the viewpoint operation information. Hereinafter, the movement amount by which the viewpoint position corresponding to the display image is moved in accordance with a viewpoint operation will be also referred to as the "operation movement amount" in some cases.

As one embodiment, the operation movement amount calculation unit 15A calculates the above-described operation movement amount, on the basis of line-of-sight operation information output by the gyro sensor 14. More specifically, angular velocities of the three axes of pitch, roll, and yaw are input from the gyro sensor 14 to the operation movement amount calculation unit 15A for each frame. In accordance with such inputs, the operation movement amount calculation unit 15A performs the following process for each of the three axes. That is, the operation movement amount calculation unit 15A calculates the rotation angle by integrating the angular velocities output from the gyro sensor 14. By subtracting the rotation angle calculated in the previous frame from the rotation angle calculated in the current frame in this manner, the operation movement amount calculation unit 15A calculates the operation movement amount of the next frame.

<1-4-2. Return Movement Amount Calculation Unit>

The return movement amount calculation unit 15B is a processing unit that calculates the movement amount by which the viewpoint position corresponding to the display image is returned to the viewpoint position corresponding to the recommended viewpoint information. Hereinafter, the movement amount by which the viewpoint position corresponding to the display image is returned to the recommended viewpoint will be also referred to as the "return movement amount" in some cases.

As one embodiment, the return movement amount calculation unit 15B calculates the above return movement amount, on the basis of recommended viewpoint information output by the decoder 12. More specifically, the return movement amount calculation unit 15B also performs the following process for each of the three axes of pitch, roll, and yaw. That is, the return movement amount calculation unit 15B calculates the above return movement amount, on the basis of the difference in the angle of the line-of-sight direction from the recommended viewpoint to the viewpoint position of the current frame. For example, the return movement amount calculation unit 15B sets a higher speed at which the viewpoint position is returned to the recommended viewpoint, as the difference in the angle of the line-of-sight direction from the recommended viewpoint to the viewpoint position of the current frame becomes larger.

Figure 5:
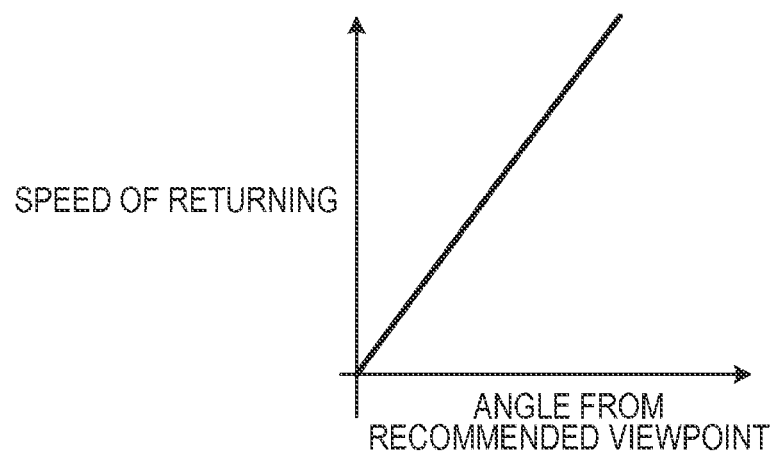
FIG. 5 is a graph showing an example method for calculating a return movement amount.
Figure 6:
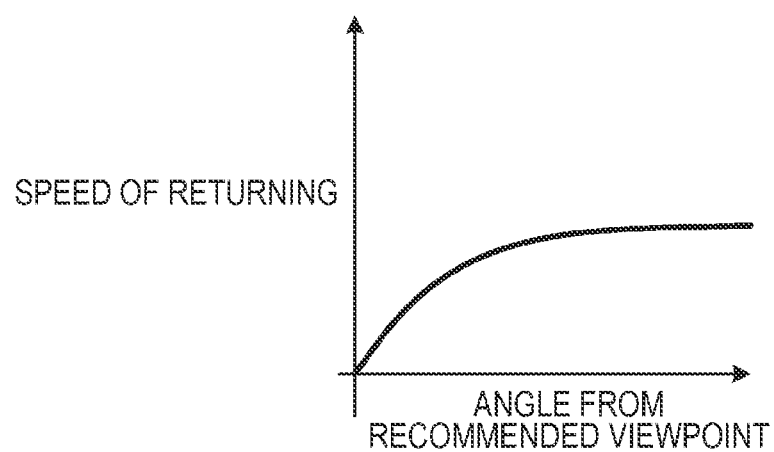
FIG. 6 is a graph showing an example method for calculating a return movement amount.

FIGS. 5 and 6 are graphs each showing an example method for calculating the return movement amount. The abscissa axis in the graphs shown in FIGS. 5 and 6 indicates the angle from the recommended viewpoint, and the abscissa axis indicates the speed at which the viewpoint position is returned to the recommended viewpoint. The "speed" mentioned herein refers to the movement amount per frame as merely an example only, and can be determined by setting the number of frames required before a return to the recommended viewpoint. As shown in FIG. 5, the above return movement amount can be calculated according to a function in which the speed at which the viewpoint position is returned to the recommended viewpoint linearly becomes higher as the difference in the angle of the line-of-sight direction from the recommended viewpoint to the viewpoint position of the current frame becomes larger. In another example, the above return movement amount can also be calculated according to a function in which the speed at which the viewpoint position is returned to the recommended viewpoint monotonically becomes higher, and the monotonic increase rate becomes lower, as the difference in the angle of the line-of-sight direction from the recommended viewpoint to the viewpoint position of the current frame becomes larger.

As the guidance control for returning the viewpoint position to the recommended viewpoint is incorporated in the transition of the display range in this manner, it is possible to visually feed back the recommended viewpoint, without displaying various marks such as a frame and an arrow indicating the position of the recommended viewpoint. Further, as the sense of distance to the recommended viewpoint can be transmitted through calculation of the above-described return movement amount according to the function illustrated in FIGS. 5 and 6, it is possible to reduce VR sickness and reduce the feeling of strangeness at the time of guidance to the recommended viewpoint. Further, as the above-described return movement amount is calculated according to the function illustrated in FIG. 6, the sense of distance to the recommended viewpoint can be more smoothly transmitted, compared with that in the case illustrated in FIG. 5.

Note that an example in which the same function is used for the three axes of pitch, roll, and yaw is described herein, but different functions may be used for the three axes. For example, for the roll axis, the above return movement amount can be set at zero, regardless of the magnitude of the difference in the angle of the line-of-sight direction from the recommended viewpoint to the viewpoint position of the current frame. Alternatively, a function multiplied by different weights for the three respective axes may be used.

Further, although FIGS. 5 and 6 illustrate example functions for determining the return movement amount, the return movement amount may not necessarily be calculated according to a function. For example, instead of a function, it is of course possible to use a look-up table or the like in which speeds at which the viewpoint position is returned to the recommended viewpoint are associated with the respective levels of the rotation angle in the line-of-sight direction from the recommended viewpoint to the viewpoint position of the current frame.

<1-4-3. Combined Movement Amount Calculation Unit>

The combined movement amount calculation unit 15C is a processing unit that calculates a combined movement amount by combining the operation movement amount and the return movement amount. As merely an example, the combined movement amount calculation unit 15C calculates the sum of the operation movement amount calculated by the operation movement amount calculation unit 15A and the return movement amount calculated by the return movement amount calculation unit 15B for each of the three axes of roll and yaw. Thus, the combined movement amount obtained by combining the operation movement amount and the return movement amount can be calculated.

<1-4-4. Viewpoint Position Calculation Unit>

The viewpoint position calculation unit 15D is a processing unit that calculates the viewpoint position of the next frame from the combined movement amount. As merely an example, the viewpoint position calculation unit 15D calculates the viewpoint position of the next frame by adding the angle of the line-of-sight direction corresponding to the combined movement amount calculated for each of the three axes of roll and yaw by the combined movement amount calculation unit 15C, and the line-of-sight direction of the current frame. After that, with the viewpoint position of the next frame as the optical center, the viewpoint position calculation unit 15D can determine the display range of the next frame to be the field of view defined depending on the horizontal angle of view and the vertical angle of view, or on the diagonal angle of view, each of which is set as the size of a display image. The display range of the next frame determined in this manner is input to the visual field rendering unit 13.

<1-5. Processing Procedures to be Carried Out by the Display Apparatus>

Figure 7:
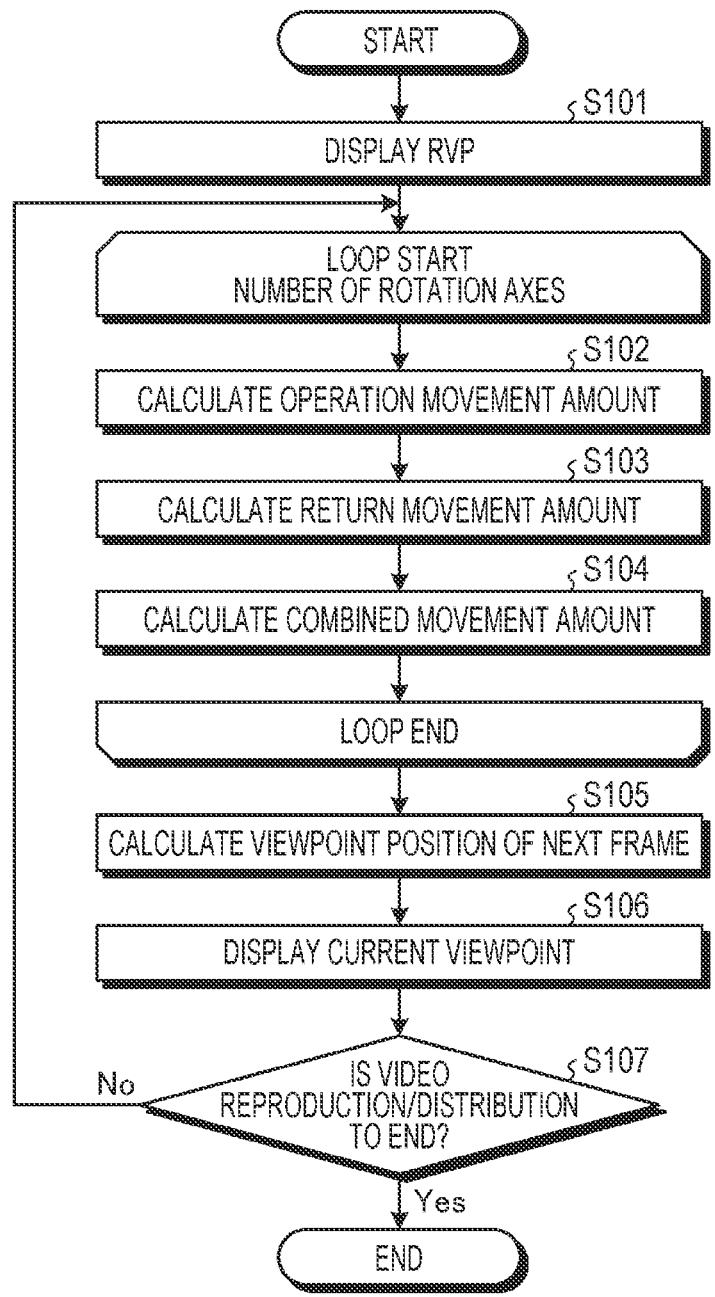
FIG. 7 is a flowchart showing the procedures in a display process according to the first embodiment.

FIG. 7 is a flowchart showing the procedures in a display process according to the first embodiment. This process, as merely an example, is started in response to a video clip reproduction start operation performed by the user. When the process is started in such a manner, the display apparatus 10 displays the recommended viewpoint, which is the range (recommended range) corresponding to the RVP, as the display range, as shown in FIG. 7 (step S101).

After that, the processes in steps S102 to S104 that follow are performed for each of the three axes of pitch, roll, and yaw.

That is, the operation movement amount calculation unit 15A calculates the above-described operation movement amount, on the basis of line-of-sight operation information output by the gyro sensor 14 (step S102). Also, the return movement amount calculation unit 15B calculates the above-described return movement amount, on the basis of recommended viewpoint information output by the decoder 12 (step S103).

After that, the combined movement amount calculation unit 15C calculates the combined movement amount by adding the operation movement amount calculated in step S102 and the return movement amount calculated in step S103 for each of the three axes of roll and yaw (step S104).

Following that, the viewpoint position calculation unit 15D calculates the viewpoint position of the next frame by adding the angle of the line-of-sight direction corresponding to the combined movement amount calculated for each of the three axes of roll and yaw in step S104, and the line-of-sight direction of the current frame (step S105).

The visual field rendering unit 13 then causes the display unit 16 to display the display image, setting the visual field corresponding to the viewpoint position of the next frame calculated in step S105 as the display range of the projection image (step S106).

After that, the processes in steps S102 to S106 described above are repeated until the video reproduction or distribution is finished (No in step S107). After that, when the video reproduction or distribution is finished (Yes in step S107), the process comes to an end.

<1-6. One Aspect of the Effect>

As described above, the display apparatus 10 of the present disclosure moves the display range of a projection image on the basis of line-of-sight operation information and recommended viewpoint information, and displays the display image corresponding to the moved display range on the display unit 16. Accordingly, with the display apparatus 10 of the present disclosure, it is possible to use a recommended viewpoint in conjunction with a free viewpoint, without indicating the position of the recommended viewpoint with a frame or the like.

<1-7. Example Application of the First Embodiment>

Figure 8:
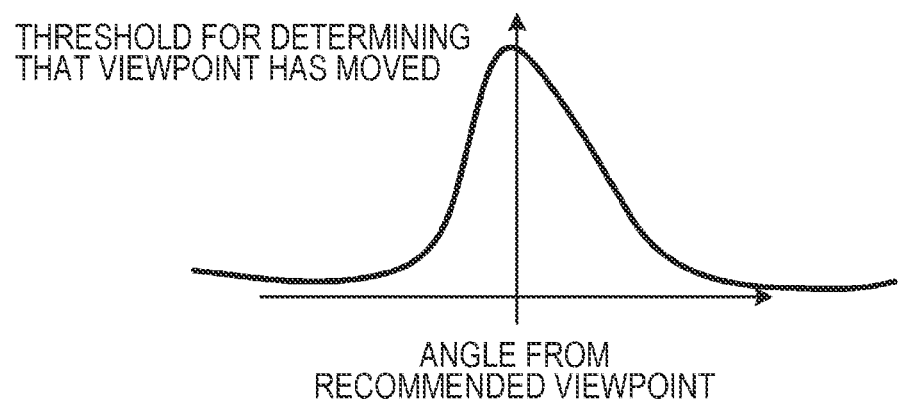
FIG. 8 is a graph showing an example method for setting a threshold.

From the aspect of reduction of vibration in the vicinity of the recommended viewpoint, the display apparatus 10 of the present disclosure can perform a threshold process for regarding that there is not a line-of-sight operation in a case where the above-described operation movement amount is equal to or smaller than a predetermined threshold. FIG. 8 is a graph showing an example method for setting a threshold. The abscissa axis in the graph shown in FIG. 8 indicates the angle from the recommended viewpoint, and the ordinate axis indicates the threshold for determining that there is not a line-of-sight operation. As shown in FIG. 8, the smaller the difference in the angle of the line-of-sight direction from the recommended viewpoint to the viewpoint position of the current frame is, the higher the threshold for determining that there is not a line-of-sight operation is set. In other words, the larger the difference in the angle of the line-of-sight direction from the recommended viewpoint to the viewpoint position of the current frame is, the lower the threshold for determining that there is not a line-of-sight operation is set. By setting such a threshold, it is possible to reduce vibration in the vicinity of the recommended viewpoint.

<1-7-1. Procedures in a Process According to the Example Application>

Figure 9:
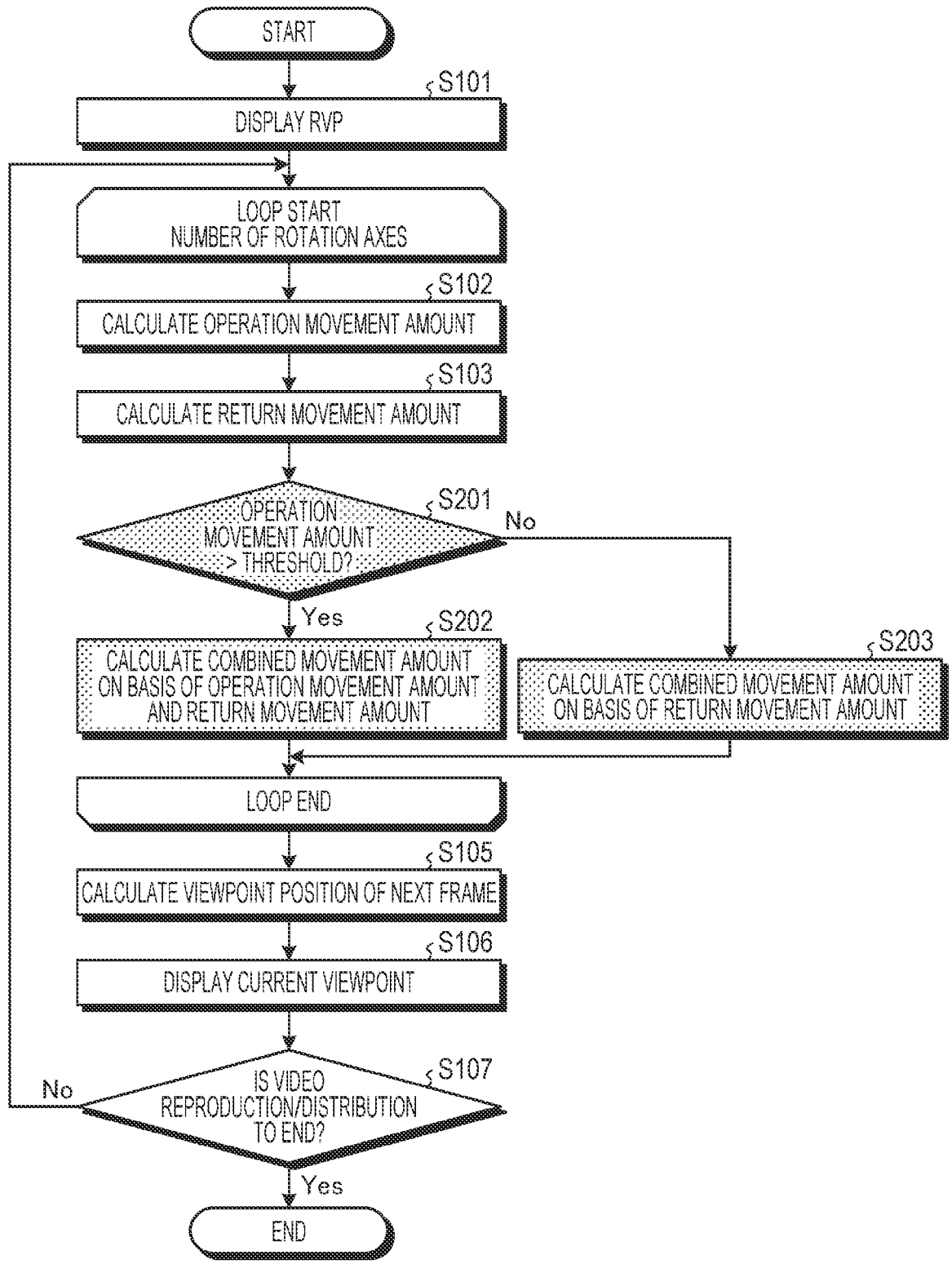
FIG. 9 is a flowchart showing the procedures in a display process according to an example application of the first embodiment.

FIG. 9 is a flowchart showing the procedures in a display process according to the example application of the first embodiment. In the flowchart shown in FIG. 9, the same step number is assigned to a step in which a process having the same contents as that in the flowchart shown in FIG. 7 is performed, but a different step number is assigned to a step in which a process having different contents is performed.

The display process illustrated in FIG. 9 differs from that illustrated in FIG. 7 in that the processes in steps S201 to S203 are added. Specifically, step S201, as merely an example, can be carried out after the process in step S103.

For example, in step S201, the combined operation amount calculation unit 15C determines whether or not the operation movement amount calculated in step S102 exceeds a predetermined threshold, such as a threshold determined by the difference in the angle of the line-of-sight direction from the recommended viewpoint to the viewpoint position of the current frame.

If the operation movement amount exceeds the threshold here, or if the operation movement amount is neither equal to nor smaller than the threshold (Yes in step 3201), the combined operation amount calculation unit 15C calculates the combined movement amount by adding the operation movement amount calculated in step S102 and the return movement amount calculated in step S103 for each of the three axes of roll and yaw (step S202).

On the other hand, if the operation movement amount does not exceed the threshold, or if the operation movement amount is equal to or smaller than the threshold (No in step S201), the combined operation amount calculation unit 15C determines that there is not a line-of-sight operation, or that the operation movement amounts of the three axes of roll and yaw are zero. That is, the combined operation amount calculation unit 15C calculates the return movement amounts of the three axes of roll and yaw as the combined movement amount (step 3203).

After that, the process in step S105 that follows is carried out on the basis of the combined movement amount calculated in step 3202 or step S203.

According to the example application of the first embodiment, vibration in the vicinity of the recommended viewpoint can be reduced.

2. Second Embodiment

In the example described above in the first embodiment described above, the sense of distance from the recommended viewpoint is transmitted through adjustment of the return movement amount. However, guidance control for returning the viewpoint position to the recommended viewpoint is not necessarily performed to transmit the sense of distance from the recommended viewpoint. In view of this, an example case where the sense of distance from the recommended viewpoint is transmitted through limitation of the above-described operation movement amount is now described as a second embodiment.

<2-1. Example Functional Configuration of a Display Apparatus>

Figure 10:
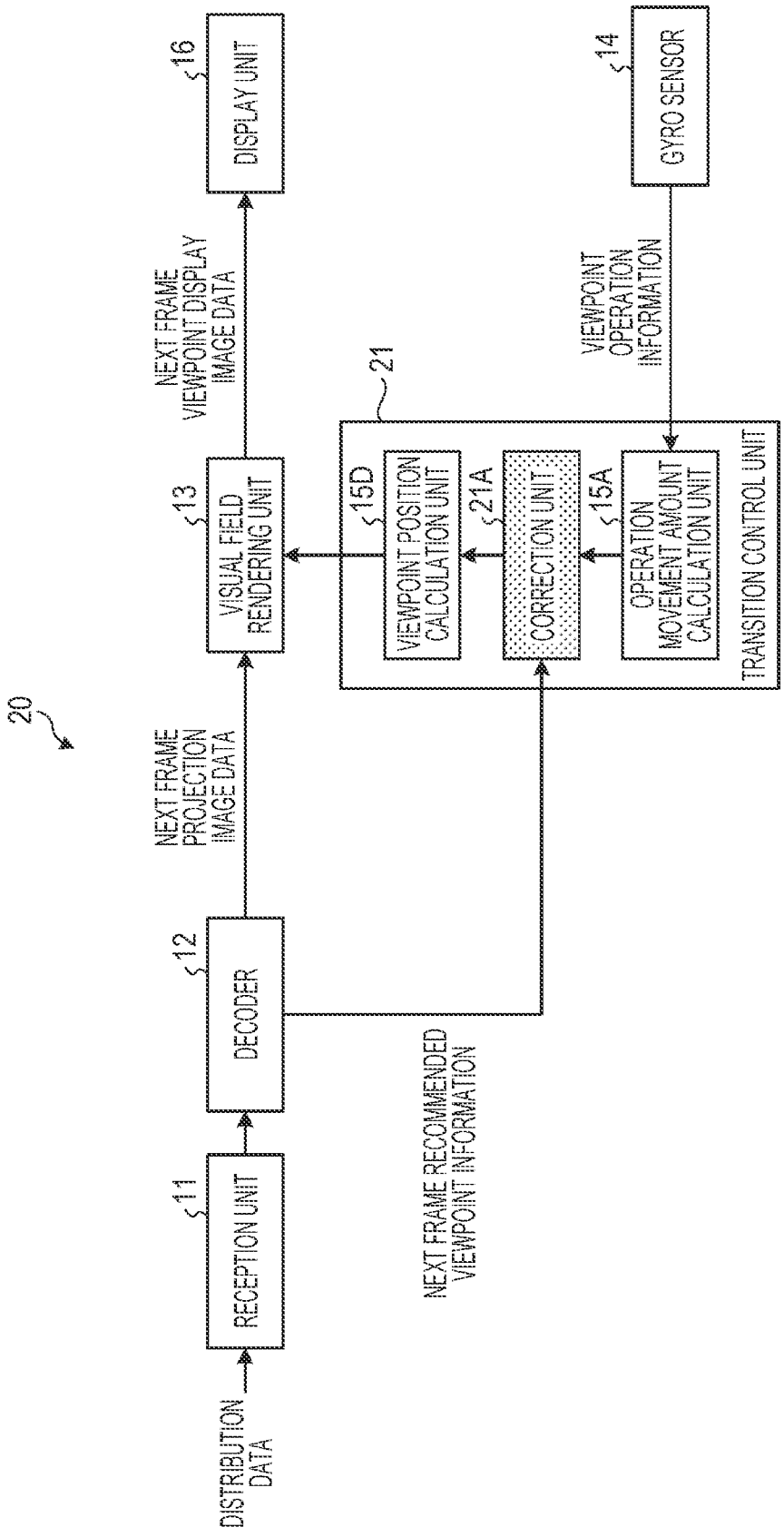
FIG. 10 is a block diagram showing an example functional configuration of a display apparatus according to a second embodiment.

FIG. 10 is a block diagram showing an example functional configuration of the display apparatus according to the second embodiment. As shown in FIG. 10, a display apparatus 20 differs from the display apparatus 10 shown in FIG. 3 in including a transition control unit 21 that performs processes partially different in contents from the processes that are performed by the transition control unit 15.

<2-2. Transition Control Unit>

The transition control unit 21 differs from the transition control unit 15 shown in FIG. 3 in not necessarily having to include functional units such as the return movement amount calculation unit 15B and the combined movement amount calculation unit 15C compatible with the control on returning of the viewpoint position to the recommended viewpoint. The transition control unit 21 also differs from the transition control unit 15 shown in FIG. 3 in including a correction unit 21A that performs correction to limit the above-described operation movement amount.

<2-2-1. Correction Unit>

The correction unit 21A is a processing unit that corrects the above-described operation movement amount, on the basis of the difference in the angle of the line-of-sight direction between the viewpoint position of the current frame and the recommended viewpoint.

Figure 11:
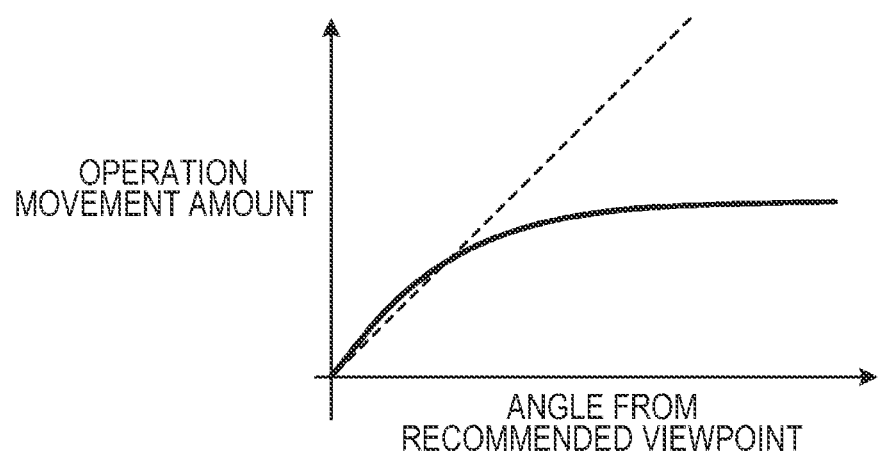
FIG. 11 is a graph showing an example method for correcting an operation movement amount.
Figure 12:
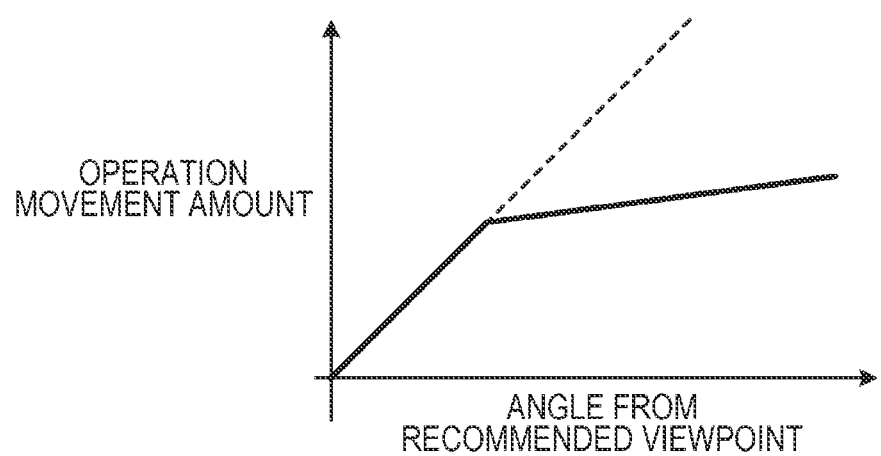
FIG. 12 is a graph showing an example method for correcting an operation movement amount.

FIGS. 11 and 12 are graphs each showing an example method for correcting an operation movement amount. The abscissa axis in the graphs shown in FIGS. 11 and 12 indicates the angle from the recommended viewpoint, and the abscissa axis indicates the operation movement amount. Further, in FIGS. 11 and 12, the post-correction operation movement amount is indicated by a solid line, while the pre-correction operation movement amount is indicated by a dashed line. As shown in FIG. 11, a function in which the rate of the monotonic increase in the post-correction operation movement amount is made lower than the rate of the monotonic increase in the pre-correction operation movement amount as the angle from the recommended viewpoint becomes greater can be used in correcting the operation movement amount. As another example, in correcting the operation movement amount, it is possible to use a function in which the pre-correction operation movement amount and the post-correction operation movement amount linearly increase at the same gradient until the angle from the recommended viewpoint increases to a predetermined angle, and the gradient at which the post-correction operation movement amount linearly increases becomes gentler than the gradient at which the pre-correction operation movement amount linearly increases when the angle from the recommended viewpoint becomes equal to or greater than the predetermined angle, as shown in FIG. 12.

As described above, a function expressed with a log or a function expressed with a threshold is used as a function that limits the increase in the operation movement amount as the angle from the recommended viewpoint becomes greater. With this arrangement, it is possible to transmit a state in which the viewpoint position is away from the recommended viewpoint with the restriction on the increase in the operation movement amount being a limiter, or is out of range from the recommended viewpoint. Accordingly, it is possible to visually feed back the recommended viewpoint, without displaying various marks such as a frame and an arrow indicating the position of the recommended viewpoint.

Note that, although FIGS. 11 and 12 illustrate example functions for determining the operation movement amounts before and after correction, the operation movement amount is not necessarily calculated according to a function. For example, instead of a function, it is of course possible to use a look-up table or the like in which the operation movement amounts before and after correction are associated with the respective levels of the rotation angle in the line-of-sight direction from the recommended viewpoint to the viewpoint position of the current frame.

<2-3. Processing Procedures To Be Carried Out by the Display Apparatus>

Figure 13:
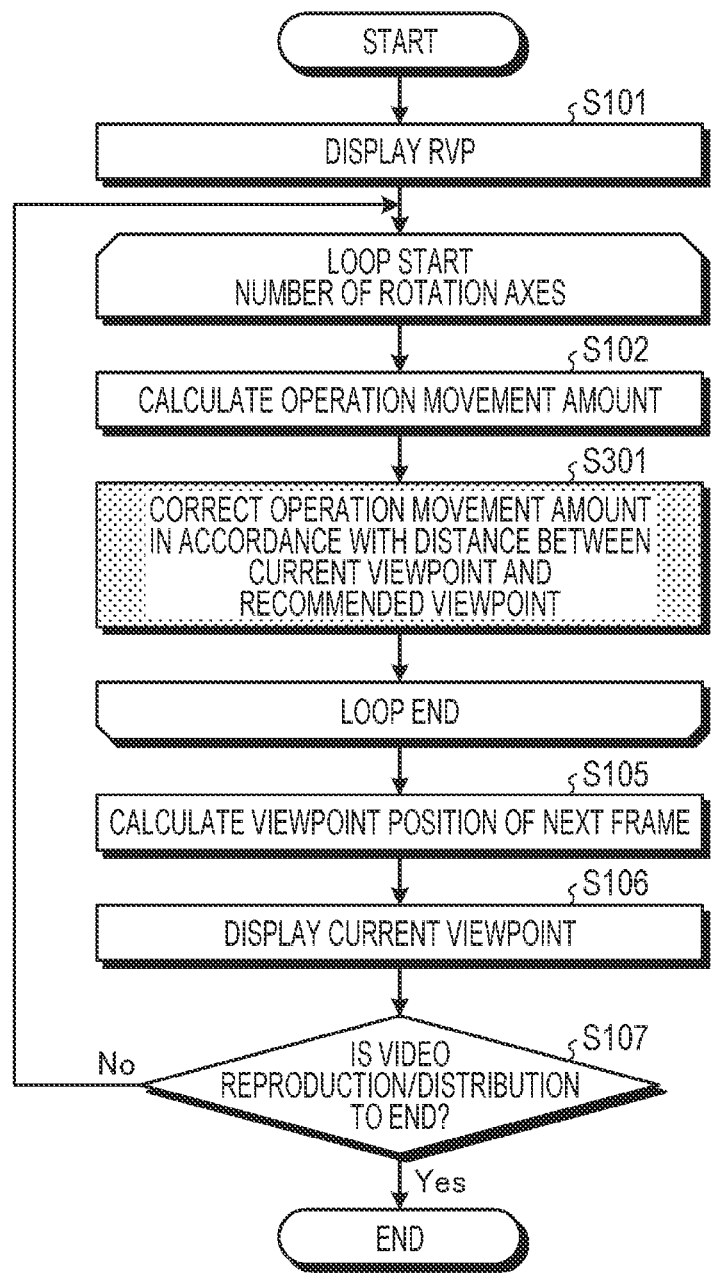
FIG. 13 is a flowchart showing the procedures in a display process according to the second embodiment.

FIG. 13 is a flowchart showing the procedures in a display process according to the second embodiment. In the flowchart shown in FIG. 13, the same step number is assigned to a step in which a process having the same contents as that in the flowchart shown in FIG. 7 is performed, but a different step number is assigned to a step in which a process having different contents is performed.

The display process shown in FIG. 13 differs from the display process shown in FIG. 7 in that the processes in steps S103 and S104 shown in FIG. 7 are omitted, and the process in step S301 is added. Specifically, step S301, as merely an example, can be carried out after the process in step S102. For example, in step S301, the correction unit 21A corrects the operation movement amount calculated in step S102, on the basis of the difference in the angle of the line-of-sight direction between the viewpoint position of the current frame and the recommended viewpoint.

After that, the process in step S105 that follows is carried out on the basis of the operation movement amount corrected in step S301.

<2-4. One Aspect of the Effect>

As described above, the display apparatus 20 of the present disclosure corrects the above-described operation movement amount, on the basis of the difference in the angle of the line-of-sight direction between the viewpoint position of the current frame and the recommended viewpoint. Accordingly, with the display apparatus 20 of the present disclosure, it is possible to use a recommended viewpoint in conjunction with a free viewpoint, without indicating the position of the recommended viewpoint with a frame or the like.

3. Third Embodiment

In the example described above in the second embodiment, the guidance control on returning of the viewpoint position to the recommended viewpoint is omitted from the above-described display apparatus 10 according to the first embodiment, and the correction of the operation movement amount is incorporated into the display apparatus 10. However, the first embodiment described above and the second embodiment described above can be combined without any change. In the example case described below as a third embodiment, the first and second embodiments described above are combined without any change.

<3-1. Example Functional Configuration of a Display Apparatus>

Figure 14:
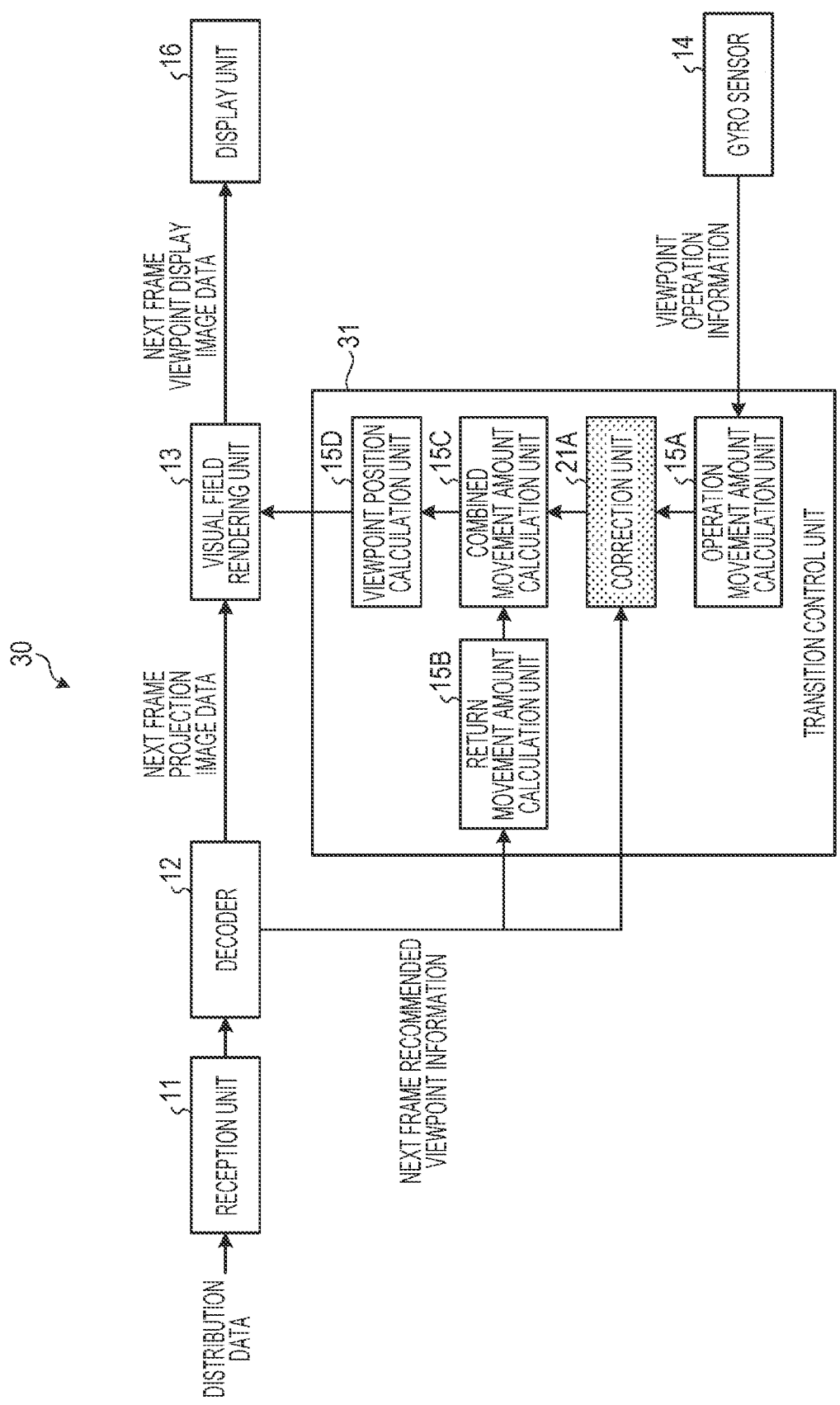
FIG. 14 is a block diagram showing an example functional configuration of a display apparatus according to a third embodiment.

FIG. 14 is a block diagram showing an example functional configuration of the display apparatus according to the third embodiment. As shown in FIG. 14, a display apparatus 30 differs from the display apparatus 10 shown in FIG. 3 in including a transition control unit 31 that performs processes partially different in contents from the processes that are performed by the transition control unit 15.

<3-2. Transition Control Unit>

The transition control unit 31 differs from the transition control unit 15 shown in FIG. 3 in further including the correction unit 21A shown in FIG. 10 in addition to the operation movement amount calculation unit 15A, the return movement amount calculation unit 15B, the combined movement amount calculation unit 15C, and the viewpoint position calculation unit 15D shown in FIG. 3.

<3-3. Processing Procedures To Be Carried Out by the Display Apparatus>

Figure 15:
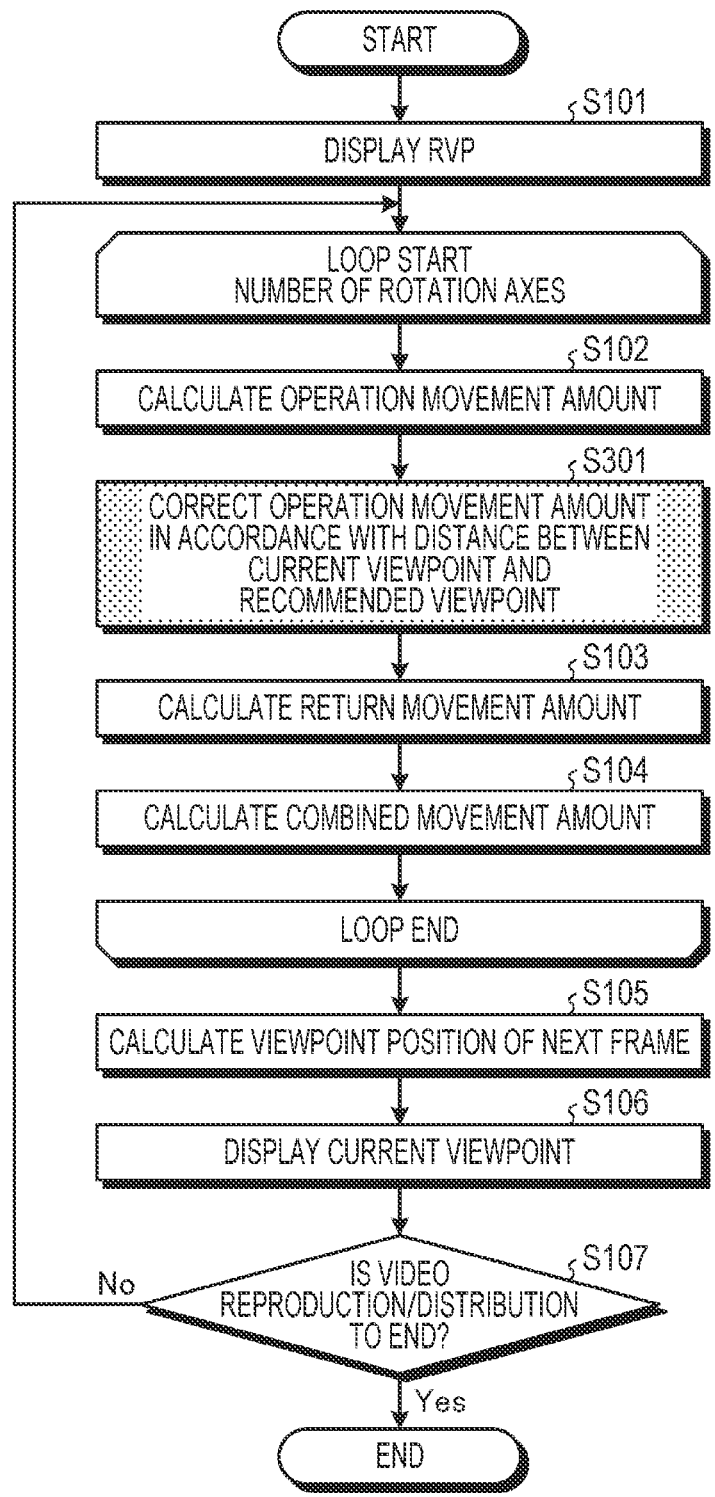
FIG. 15 is a flowchart showing the procedures in a display process according to the third embodiment.

FIG. 15 is a flowchart showing the procedures in a display process according to the third embodiment. In the flowchart shown in FIG. 15, the same step number is assigned to a step in which a process having the same contents as those in the flowcharts shown in FIGS. 7 and 13 is performed, but a different step number is assigned to a step in which a process having different contents is performed.

This process, as merely an example, is also started in response to a video clip reproduction start operation performed by the user. When the process is started in such a manner, the display apparatus 10 displays the recommended viewpoint, which is the range (recommended range) corresponding to the RVP, as the display range, as shown in FIG. 15 (step S101).

After that, the processes in steps S102 to S104 that follow are performed for each of the three axes of pitch, roll, and yaw.

That is, the operation movement amount calculation unit 15A calculates the above-described operation movement amount, on the basis of line-of-sight operation information output by the gyro sensor 14 (step S102). The correction unit 21A then corrects the operation movement amount calculated in step S102, on the basis of the difference in the angle of the line-of-sight direction between the viewpoint position of the current frame and the recommended viewpoint (step S301). Also, the return movement amount calculation unit 15B calculates the above-described return movement amount, on the basis of recommended viewpoint information output by the decoder 12 (step S103).

After that, the combined movement amount calculation unit 15C calculates the combined movement amount by adding the operation movement amount corrected in step S301 and the return movement amount calculated in step S103 for each of the three axes of roll and yaw (step S104).

Following that, the viewpoint position calculation unit 15D calculates the viewpoint position of the next frame by adding the angle of the line-of-sight direction corresponding to the combined movement amount calculated for each of the three axes of roll and yaw in step S104, and the line-of-sight direction of the current frame (step S105).

The visual field rendering unit 13 then causes the display unit 16 to display the display image, setting the visual field corresponding to the viewpoint position of the next frame calculated in step S105 as the display range of the projection image (step S106).

After that, the processes in steps S102 to S106 described above are repeated until the video reproduction or distribution is finished (No in step S107). After that, when the video reproduction or distribution is finished (Yes in step S107), the process comes to an end.

<3-4. One Aspect of the Effect>

As described above, with the display apparatus 30 of the present disclosure, it is possible to achieve the effects of both the display apparatus 10 according to the first embodiment described above and the display apparatus 20 according to the second embodiment described above. For example, with the display apparatus 30 of the present disclosure, it is possible to transmit the sense of distance to the recommended viewpoint, a position out of the range from the recommended viewpoint, and the like.

4. Fourth Embodiment

In the example cases described above in the first to third embodiments, there is one recommended viewpoint in the processes. However, there may be a plurality of recommended viewpoints. In the example process described below as a fourth embodiment, one recommended viewpoint is selected from a plurality of recommended viewpoints.

<4-1. Example Functional Configuration of a Display Apparatus>

Figure 16:
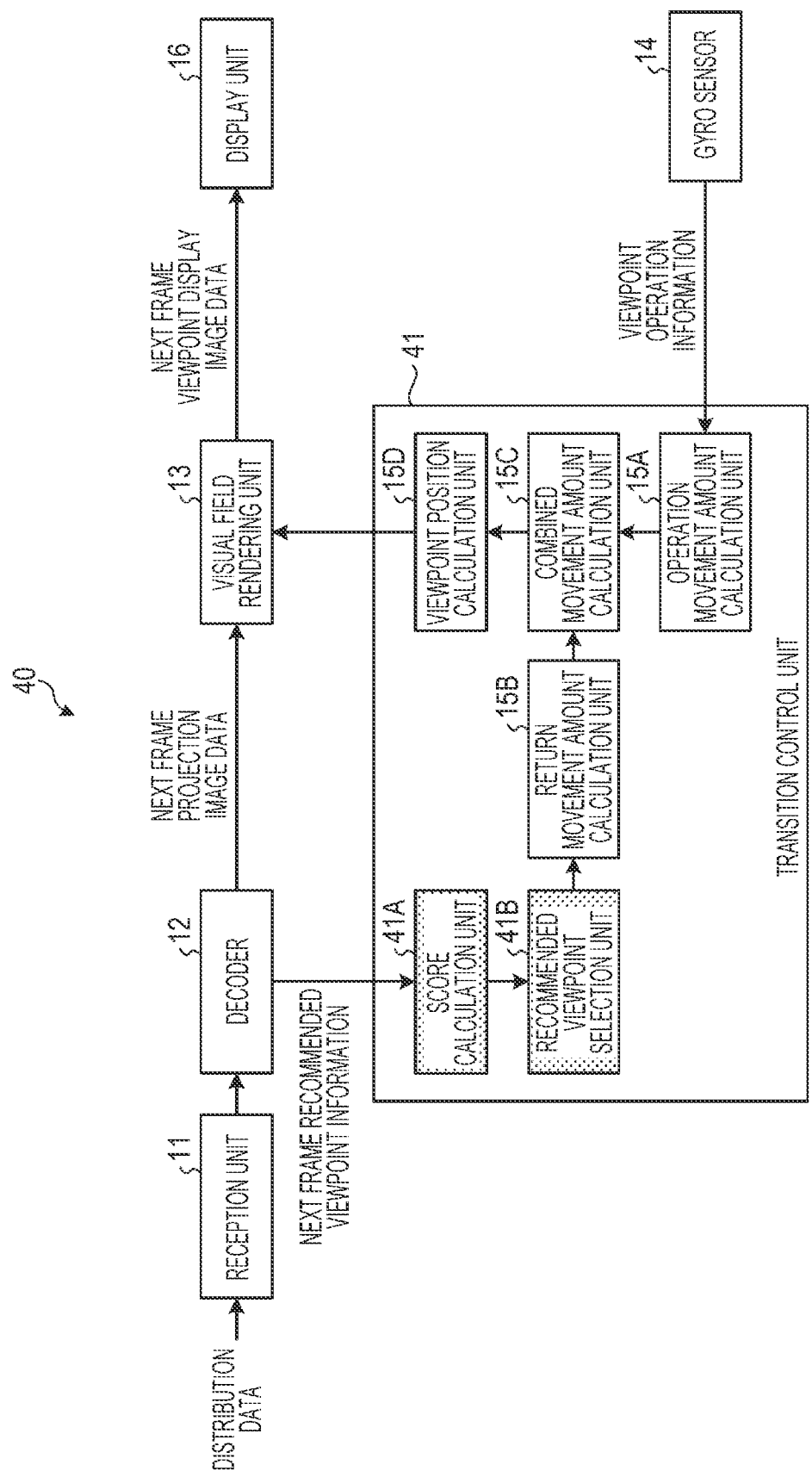
FIG. 16 is a block diagram showing an example functional configuration of a display apparatus according to a fourth embodiment.

FIG. 16 is a block diagram showing an example functional configuration of the display apparatus according to the fourth embodiment. As shown in FIG. 16, a display apparatus 40 differs from the display apparatus 10 shown in FIG. 3 in including a transition control unit 41 that performs processes partially different in contents from the processes that are performed by the transition control unit 15.

<4-2. Transition Control Unit>

The transition control unit 41 differs from the transition control unit 15 shown in FIG. 3 in further including a score calculation unit 41A and a recommended viewpoint selection unit 41B.

<4-2-1. Score Calculation Unit>

The score calculation unit 41A is a processing unit that calculates the score of each recommended viewpoint.

Figure 17:
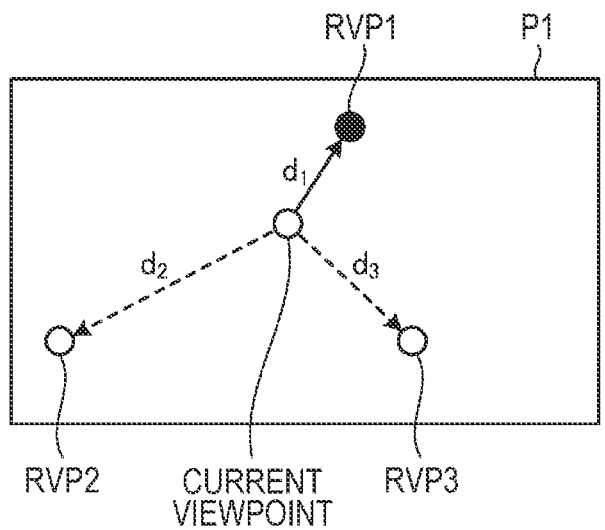
FIG. 17 is a diagram showing an example of distances to be used in score calculation.

As merely an example, the score calculation unit 41A can calculate the score of a recommended viewpoint from the distance between the viewpoint position of the current frame and the recommended viewpoint according to Expression (1) shown below. "$S_i$" in Expression (1) shown below represents the score of the ith recommended viewpoint. Meanwhile, "$d_i$" in Expression (1) shown below represents the distance between the ith recommended viewpoint and the viewpoint position of the current frame. FIG. 17 is a diagram showing an example of distances to be used in score calculation. FIG. 17 shows three recommended viewpoints RVP1 to RVP3 and the viewpoint position of the current frame in a projection image. In the example shown in FIG. 17, the magnitude relationship among the distances $d_1$, $d_2$, and $d_3$ between the three recommended viewpoints RVP1 to RVP3 and the viewpoint position of the current frame is "$d_1<d_3<d_2$". Accordingly, the magnitude relationship among the scores of the recommended viewpoints RVP1 to RVP3 is "$S_1>S_3>S_2$".

$$S_i=1/d_i \qquad (1)$$

As another example, the score calculation unit 41A can calculate the score of a recommended viewpoint by allocating a predetermined weight to the distance between the viewpoint position of the current frame and the recommended viewpoint according to Expression (2) shown below. "$S_i$" in Expression (2) shown below represents the score of the ith recommended viewpoint. Meanwhile, "$d_i$" in Expression (2) shown below represents the distance between the ith recommended viewpoint and the viewpoint position of the current frame. Further, "$w_i$" in Expression (2) shown below represents the weight for the ith recommended viewpoint. For example, the weight for a recommended viewpoint may be set by a user of a distribution source such as a director, or by an end user who is a viewer. Further, it is possible to automatically set a larger weight for a recommended viewpoint having a larger number of viewers, by referring to the viewing histories of the distribution data of a plurality of viewers.

$$S_i=w_i/d_i \qquad (2)$$

Figure 18:
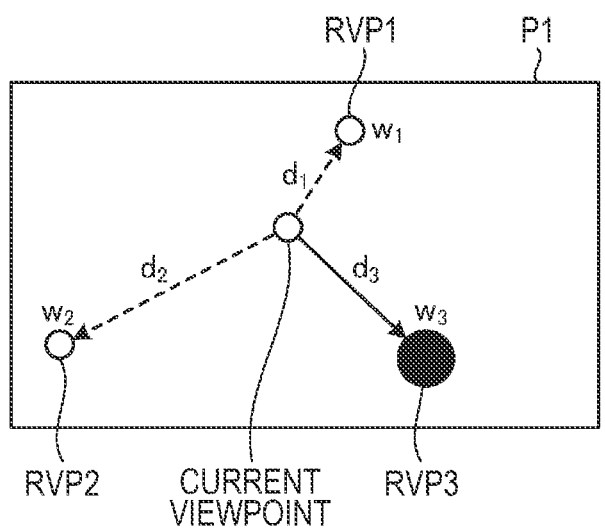
FIG. 18 is a diagram showing an example of distances and weights to be used in score calculation.

FIG. 18 is a diagram showing an example of distances and weights to be used in score calculation. Like FIG. 17, FIG. 18 shows three recommended viewpoints RVP1 to RVP3 and the viewpoint position of the current frame in a projection image. Further, in FIG. 18, the weights for the recommended viewpoints RVP1 to RVP3 are represented by the sizes of circles. In the example shown in FIG. 18, the magnitude relationship among the distances $d_1$, $d_2$, and $d_3$ between the three recommended viewpoints RVP1 to RVP3 and the viewpoint position of the current frame is "$d_1<d_3<d_2$". On the other hand, the magnitude relationship among the weights for the three recommended viewpoints RVP1 to RVP3 is "$w_1=w_2<w_3$". In this case, the magnitude relationship among the scores of the recommended viewpoints RVP1 to RVP3 is not necessarily "$S_1>S_3>S_2$". That is, depending on the weight $w_3$ of the recommended viewpoint RVP3, the magnitude relationship among the scores of the recommended viewpoints RVP1 to RVP3 may be "$S_3>S_1>S_2$" in some cases, as shown in FIG. 18.

<4-2-2. Recommended Viewpoint Selection Unit>

The recommended viewpoint selection unit 41B is a processing unit that selects one recommended viewpoint from a plurality of recommended viewpoints.

As merely an example, the recommended viewpoint selection unit 41B selects the recommended viewpoint having the highest score in the plurality of recommended viewpoints. For example, while the recommended viewpoint RVP1 is selected from among the recommended viewpoints RVP1 to RVP3 in the example shown in FIG. 17, the recommended viewpoint RVP3 is selected from among the recommended viewpoints RVP1 to RVP3 in the example shown in FIG. 18.

By selecting the recommended viewpoint having the highest score in this manner, it is possible to recommend the closest recommended viewpoint or recommend the recommended viewpoint that is the worthiest to see in the distribution data.

Note that, in the example described herein, a score with a higher priority level is calculated from a recommended viewpoint having a higher score value. However, the present disclosure is not limited to this example. For example, a score with a higher priority level may be calculated from a recommended viewpoint having a lower score value. In this case, it is only required to select the recommended viewpoint having the lowest score.

<4-3. Processing Procedures to be Carried Out by the Display Apparatus>

Figure 19:
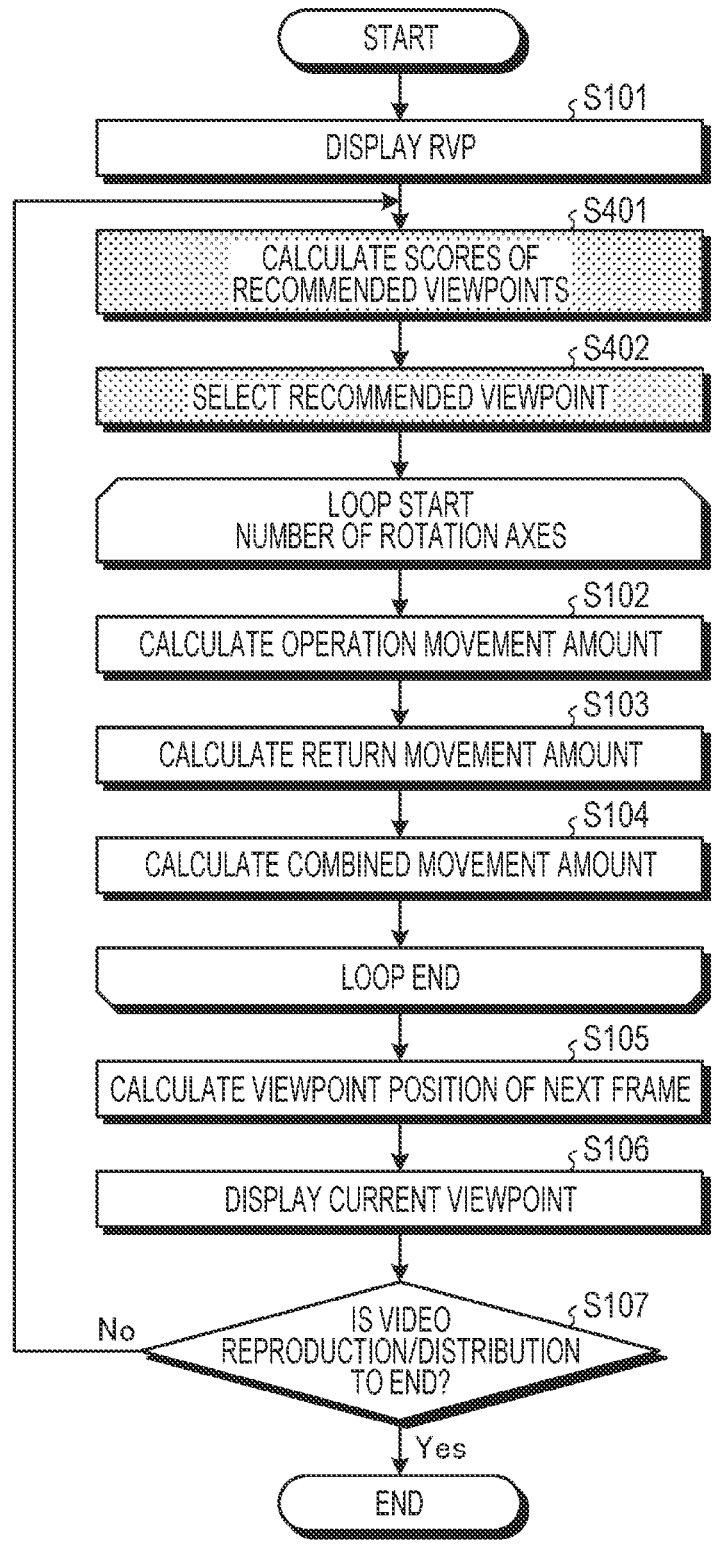
FIG. 19 is a flowchart showing the procedures in a display process according to the fourth embodiment.

FIG. 19 is a flowchart showing the procedures in a display process according to the fourth embodiment. In the flowchart shown in FIG. 19, the same step number is assigned to a step in which a process having the same contents as that in the flowchart shown in FIG. 7 is performed, but a different step number is assigned to a step in which a process having different contents is performed.

The display process shown in FIG. 19 differs from the display process shown in FIG. 7 in that the processes in steps S401 and S402 are carried out after the process in step S101 shown in FIG. 7. Specifically, in step S401, as merely an example, the score calculation unit 41A calculates the score of each recommended viewpoint. After that, the recommended viewpoint selection unit 41B selects one recommended viewpoint from the plurality of recommended viewpoints, on the basis of the scores calculated in step S401 (step S402).

After that, the process in step S102 is carried out for the recommended viewpoint selected in step S402.

<4-4. One Aspect of the Effect>

As described above, the display apparatus 40 of the present disclosure calculates the score of each recommended viewpoint, and selects one recommended viewpoint from the plurality of recommended viewpoints on the basis of the scores. Thus, with the display apparatus 40 of the present disclosure, it is possible to select one recommended viewpoint even in a case where there exists a plurality of recommended viewpoints.

5. Modifications

In the description below, modifications of the first to fourth embodiments are described.

<5-1. Non-Visual Feedback>

Although examples in which transmission of the position of a recommended viewpoint is performed through a transition of the display range of the projection image have been described in the first to fourth embodiments, the position of the recommended viewpoint can be transmitted by a method other than display. For example, the position of a recommended viewpoint can be transmitted through an audio output. As an example, it is possible to make the user perceive the presence of the sound source in the direction of the recommended viewpoint, by lowering the sound volume as the distance from the recommended viewpoint increases, or by localizing a sound image at the recommended viewpoint through stereophonic sound. Other than such sound outputs, when the distance from the recommended viewpoint to the viewpoint position of the current frame or the next frame increases by an amount equal to or larger than a predetermined value, it is possible to make the user perceive vibration by activating a vibrator or the like, or to make the user perceive a greater weight through a gyroscope as the distance from the recommended viewpoint increases.

<5-2. Conditions for Execution of Guidance Control>

In the examples described in the first embodiment, the third embodiment, and the fourth embodiment, guidance control for returning the viewpoint position to the recommended viewpoint is performed for each frame.

However, a certain condition can also be set. For example, the display apparatus 10, 30, or 40 may perform guidance control for returning the viewpoint position to the recommended viewpoint only in a case where the operation movement amount is zero or is equal to or smaller than a predetermined threshold, or where there is not a line-of-sight operation. For example, in a case where the operation movement amount is zero or is equal to or smaller than a predetermined threshold, it is possible to cause the return movement amount calculation unit to calculate the return movement amount.

<5-3. Apparatus in which the Functions are Implemented>

In the examples described in the first to fourth embodiments, the transition control units 15, 21, 31, and 41 are mounted in the display apparatuses 10, 20, 30, and 40. However, the transition control units 15, 21, 31, and 41 may be mounted in the distribution server 9. In this case, it is only required to acquire line-of-sight operation information generated by the gyro sensor 14, from the display apparatus 10, 20, 30, or 40. As described above, in addition to the display apparatuses 10, 20, 30, and 40, the distribution server 9 can also correspond to an example of the image processing apparatus.

<5-4. Other Modifications>

Further, among the respective processes described in the above embodiments, all or some of the processes described as being performed automatically can be performed manually, or all or some of the processes described as being performed manually can be performed automatically by a known method. Other than that, the process procedures, the specific names, and the information including various kinds of data and parameters mentioned above in the document and shown in the drawings can be changed as appropriate, unless otherwise specified. For example, the various kinds of information shown in the respective drawings are not limited to those shown in the drawings.

Further, each component of each apparatus shown in the drawings is functionally conceptual, and is not required to be physically formed as shown in the drawings. That is, the specific modes of distribution and integration of each apparatus are not limited to those shown in the drawings, and all or some of them can be functionally or physically distributed and integrated by an appropriate unit, in accordance with various loads, usage conditions, and the like.

Furthermore, the advantageous effects of the respective embodiments described in this specification are merely examples, and the advantageous effects of the technology are not limited to them and may include other effects.

6. Hardware Configuration

The series of processes in the display apparatus 10, 20, 30, or 40 described above can be performed by hardware, and can also be performed by software. In a case where the series of processes are to be performed by software, the program that forms the software is installed into a computer. Here, the computer may be a computer incorporated into special-purpose hardware, or may be a general-purpose personal computer or the like that can execute various kinds of functions, having various kinds of programs installed therein, for example.

Figure 20:
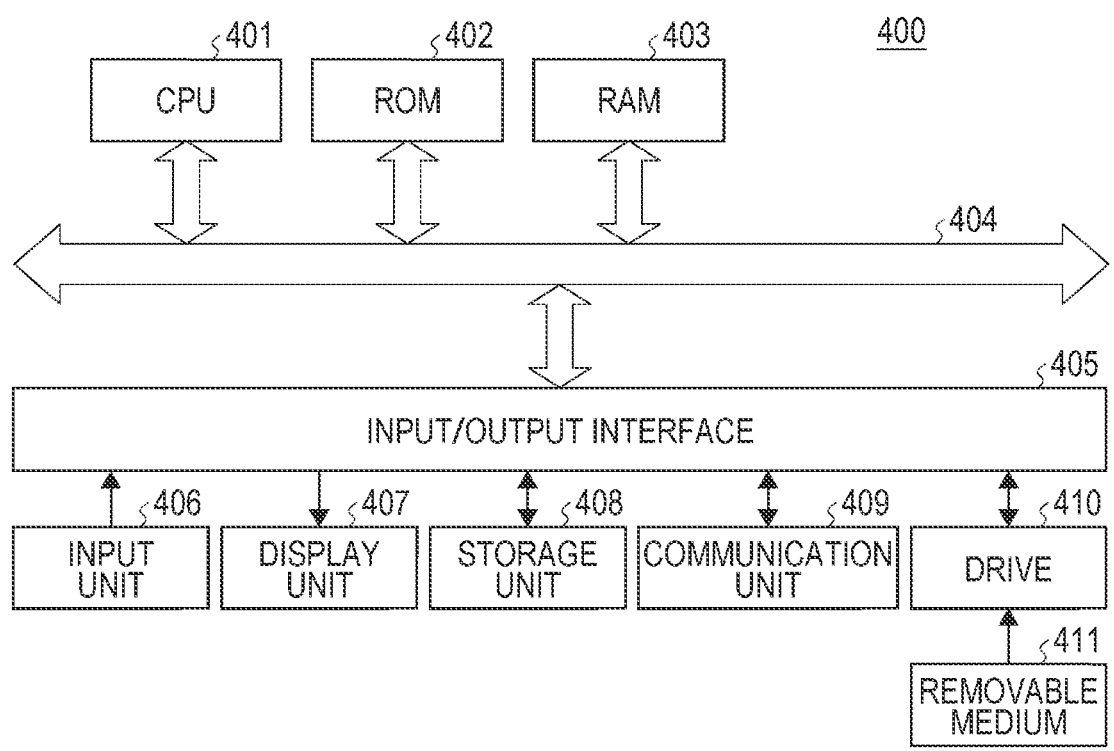
FIG. 20 is a block diagram showing an example configuration of the hardware of a computer.

FIG. 20 is a block diagram showing an example configuration of the hardware of a computer 400.

In the computer 400, a central processing unit (CPU) 401, a read only memory (ROM) 402, and a random access memory (RAM) 403 are connected to one another by a bus 404.

An input/output interface 405 is further connected to the bus 404. An input unit 406, an output unit 407, a recording unit 408, a communication unit 409, and a drive 410 are connected to the input/output interface 405.

The input unit 406 is formed with an input switch, a button, a microphone, an imaging element, and the like. The output unit 407 is formed with a display, a speaker, and the like. The recording unit 408 is formed with a hard disk, a nonvolatile memory, or the like. The communication unit 409 is formed with a network interface or the like. The drive 410 drives a removable medium 411 such as a magnetic disk, an optical disk, a magnetooptical disk, or a semiconductor memory.

In the computer 400 having the above described configuration, the CPU 401 loads a program recorded in the recording unit 408 into the RAM 403 via the input/output interface 405 and the bus 404, for example, and executes the program, so that the above described series of processes is performed.

The program to be executed by the computer 400 (the CPU 401) may be recorded on the removable medium 411 as a package medium to be provided, for example. Alternatively, the program can be provided via a wired or wireless transmission medium, such as a local area network, the Internet, or digital satellite broadcasting.

In the computer, the program can be installed into the recording unit 408 via the input/output interface 405 when the removable medium 411 is mounted on the drive 410. The program can also be received by the communication unit 409 via a wired or wireless transmission medium, and be installed into the recording unit 408. Alternatively, the program can be installed beforehand into the ROM 402 or the recording unit 408.

Note that the program to be executed by the computer may be a program for performing processes in chronological order in accordance with the sequence described in this specification, or may be a program for performing processes in parallel or performing a process when necessary, such as when there is a call.

Note that the present technology can also be embodied in the configurations described below.

(1)

An image processing apparatus including:

an output unit that outputs part of an image including recommended viewpoint information as a display image to a display unit; and a transition control unit that causes a display range of the image to shift, on the basis of a positional relationship between a viewpoint position corresponding to the display image output to the display unit and a viewpoint position corresponding to the recommended viewpoint information, in which the output unit outputs part of the image to the display unit, on the basis of the display range that has been made to shift.

(2)

The image processing apparatus according to (1), in which the transition control unit includes:

an operation movement amount calculation unit that calculates an operation movement amount for moving the viewpoint position corresponding to the display image in accordance with a viewpoint operation based on viewpoint operation information;

a return movement amount calculation unit that calculates a return movement amount for returning the viewpoint position corresponding to the display image to the viewpoint position corresponding to the recommended viewpoint information; and a viewpoint position calculation unit that calculates a viewpoint position of a next frame to be output after a frame of the display image output to the display unit, on the basis of the operation movement amount and the return movement amount, and the output unit outputs part of the image to the display unit, on the basis of the display range determined from the viewpoint position of the next frame.

(3)

The image processing apparatus according to (2), in which the return movement amount calculation unit calculates the return movement amount, on the basis of a difference in an angle of a line-of-sight direction from the viewpoint position corresponding to the recommended viewpoint information to the viewpoint position corresponding to the display image.

(4)

The image processing apparatus according to (3), in which the return movement amount calculation unit sets a higher speed for returning to the viewpoint position corresponding to the recommended viewpoint information as the difference in the angle of the line-of-sight direction becomes larger.

(5)

The image processing apparatus according to (4), in which the return movement amount calculation unit linearly increases the speed for returning to the viewpoint position corresponding to the recommended viewpoint information as the difference in the angle of the line-of-sight direction becomes larger.

(6)

The image processing apparatus according to (4), in which the return movement amount calculation unit monotonically increases the speed for returning to the viewpoint position corresponding to the recommended viewpoint information, and lowers a rate of the monotonic increase, as the difference in the angle of the line-of-sight direction becomes larger.

(7)

The image processing apparatus according to any one of (2) to (6), in which the viewpoint position calculation unit calculates the viewpoint position of the next frame on the basis of the return movement amount when the operation movement amount is equal to or smaller than a predetermined threshold, and calculates the viewpoint position of the next frame on the basis of the operation movement amount and the return movement amount when the operation movement amount is neither equal to nor smaller than the threshold.

(8)

The image processing apparatus according to (7), in which the value of the threshold becomes greater as a difference in an angle of a line-of-sight direction from the viewpoint position corresponding to the recommended viewpoint information to the viewpoint position corresponding to the display image becomes smaller.

(9)

The image processing apparatus according to any one of (1) to (8), in which the transition control unit includes:

an operation movement amount calculation unit that calculates an operation movement amount for moving the viewpoint position corresponding to the display image in accordance with a viewpoint operation based on viewpoint operation information;

a correction unit that corrects the operation movement amount, on the basis of a difference in an angle of a line-of-sight direction from the viewpoint position corresponding to the recommended viewpoint information to the viewpoint position corresponding to the display image; and a viewpoint position calculation unit that calculates a viewpoint position of a next frame to be output after a frame of the display image output to the display unit, on the basis of the post-correction operation movement amount, and the output unit outputs part of the image to the display unit, on the basis of the display range determined from the viewpoint position of the next frame.

(10)

The image processing apparatus according to (9), in which the correction unit lowers a rate of a monotonic increase in the post-correction operation movement amount as compared with a rate of a monotonic increase in the pre-correction operation movement amount, as the difference in the angle of the line-of-sight direction increases.

(11)

The image processing apparatus according to (9), in which the correction unit linearly increases the pre-correction operation movement amount and the post-correction operation movement amount at the same gradient until the difference in the angle of the line-of-sight direction increases to a predetermined angle, and, when the difference in the angle of the line-of-sight direction becomes equal to or larger than the predetermined angle, the correction unit linearly increases the post-correction operation movement amount at a gentler gradient than the gradient at which the correction unit linearly increases the pre-correction operation movement amount.

(12)

The image processing apparatus according to any one of (2) to (11), further including:

a score calculation unit that calculates a score for each viewpoint position included in the recommended viewpoint information; and a recommended viewpoint selection unit that selects one of the viewpoint positions included in the recommended viewpoint information, on the basis of the score, in which the return movement amount calculation unit calculates the return movement amount for returning the viewpoint position corresponding to the display image to the viewpoint position selected from among the viewpoint positions included in the recommended viewpoint information.

(13)

The image processing apparatus according to (12), in which the score calculation unit calculates the score, on the basis of a distance between the viewpoint position included in the recommended viewpoint information and the viewpoint position corresponding to the display image.

(14)

The image processing apparatus according to (13), in which the score calculation unit make a value of the score smaller, as the distance becomes longer.

(15)

The image processing apparatus according to (13), in which the score calculation unit calculates the score by giving a predetermined weight to the distance.

(16)

The image processing apparatus according to (15), in which the score calculation unit makes the value of the score greater as the weight becomes larger, or makes the value of the score smaller as the weight becomes smaller.

(17)

The image processing apparatus according to (16), in which a larger value is assigned to the weight at a recommended viewpoint having a larger number of viewers.

(18)

The image processing apparatus according to any one of (2) to (17), in which the return movement amount calculation unit calculates the return movement amount, when the operation movement amount is equal to or smaller than a predetermined threshold.

(19)

An image processing method implemented by a computer that performs the processes of:

outputting part of an image including recommended viewpoint information as a display image to a display unit; and causing a display range of the image to shift, on the basis of a positional relationship between a viewpoint position corresponding to the display image output to the display unit and a viewpoint position corresponding to the recommended viewpoint information, in which the process of outputting part of the image to the display unit includes outputting part of the image to the display unit, on the basis of the display range that has been made to shift.

(20)

A program for causing a computer to perform the processes of:

outputting part of an image including recommended viewpoint information as a display image to a display unit; and causing a display range of the image to shift, on the basis of a positional relationship between a viewpoint position corresponding to the display image output to the display unit and a viewpoint position corresponding to the recommended viewpoint information, in which the process of outputting part of the image to the display unit includes outputting part of the image to the display unit, on the basis of the display range that has been made to shift.

REFERENCE SIGNS LIST

1 Image distribution system
3 Multi-camera
5 Wide-viewing-angle image conversion unit
7 Encoder
9 Distribution server
10 Display apparatus
11 Reception unit
12 Decoder
13 Visual field rendering unit
14 Gyro sensor
15 Transition control unit
15A Operation movement amount calculation unit
15B Return movement amount calculation unit
15C Combined movement amount calculation unit
15D Viewpoint position calculation unit
16 Display unit

The invention claimed is:

1. An image processing apparatus comprising:
an output unit configured to output part of an image including recommended viewpoint information as a display image to a display unit; and
a transition control unit configured to cause a display range of the image to shift, based on a positional relationship between a viewpoint position corresponding to the display image output to the display unit and a viewpoint position corresponding to the recommended viewpoint information,
wherein the transition control unit causes the display range to shift at a speed determined based on a difference in an angle of a line-of-sight direction from the viewpoint position corresponding to the recommended viewpoint information to the viewpoint position corresponding to the display image,
wherein the output unit outputs the part of the image to the display unit based on the display range that has been made to shift,
wherein the transition control unit includes:
an operation movement amount calculation unit configured to calculate an operation movement amount for moving the viewpoint position corresponding to the display image in accordance with a viewpoint operation based on viewpoint operation information;

a return movement amount calculation unit configured to calculate a return movement amount for returning the viewpoint position corresponding to the display image to the viewpoint position corresponding to the recommended viewpoint information; and a viewpoint position calculation unit configured to calculate a viewpoint position of a next frame to be output after a frame of the display image output to the display unit, based on the operation movement amount and the return movement amount, wherein the output unit outputs the part of the image to the display unit, based on the display range determined from the viewpoint position of the next frame, wherein the return movement amount calculation unit calculates the return movement amount, based on the difference in the angle of the line-of-sight direction from the viewpoint position corresponding to the recommended viewpoint information to the viewpoint position corresponding to the display image, and wherein the output unit and the transition control unit are each implemented via at least one processor.

2. The image processing apparatus according to claim 1, wherein the return movement amount calculation unit sets a higher speed for returning to the viewpoint position corresponding to the recommended viewpoint information as the difference in the angle of the line-of-sight direction becomes larger.

3. The image processing apparatus according to claim 2, wherein the return movement amount calculation unit linearly increases the speed for returning to the viewpoint position corresponding to the recommended viewpoint information as the difference in the angle of the line-of-sight direction becomes larger.

4. The image processing apparatus according to claim 2, wherein the return movement amount calculation unit monotonically increases the speed for returning to the viewpoint position corresponding to the recommended viewpoint information, and lowers a rate of the monotonic increase, as the difference in the angle of the line-of-sight direction becomes larger.

5. The image processing apparatus according to claim 1, wherein the viewpoint position calculation unit calculates the viewpoint position of the next frame based on the return movement amount when the operation movement amount is equal to or smaller than a predetermined threshold, and calculates the viewpoint position of the next frame based on the operation movement amount and the return movement amount when the operation movement amount is greater than the predetermined threshold.

6. The image processing apparatus according to claim 5, wherein a value of the threshold becomes greater as a difference in an angle of a line-of-sight direction from the viewpoint position corresponding to the recommended viewpoint information to the viewpoint position corresponding to the display image becomes smaller.

7. The image processing apparatus according to claim 1, wherein the transition control unit includes:

an operation movement amount calculation unit configured to calculate an operation movement amount for moving the viewpoint position corresponding to the display image in accordance with a viewpoint operation based on viewpoint operation information;

a correction unit configured to correct the operation movement amount, based on a difference in an angle of a line-of-sight direction from the viewpoint position corresponding to the recommended viewpoint information to the viewpoint position corresponding to the display image; and a viewpoint position calculation unit configured to calculate a viewpoint position of a next frame to be output after a frame of the display image output to the display unit, based on the post-correction operation movement amount, and wherein the output unit outputs the part of the image to the display unit, based on the display range determined from the viewpoint position of the next frame.

8. The image processing apparatus according to claim 7, wherein the correction unit makes a rate of a monotonic increase in the post-correction operation movement amount lower than a rate of a monotonic increase in the pre-correction operation movement amount, as the difference in the angle of the line-of-sight direction becomes larger.

9. The image processing apparatus according to claim 7, wherein the correction unit linearly increases the pre-correction operation movement amount and the post-correction operation movement amount at the same gradient until the difference in the angle of the line-of-sight direction increases to a predetermined angle, and, when the difference in the angle of the line-of-sight direction becomes equal to or larger than the predetermined angle, the correction unit linearly increases the post-correction operation movement amount at a gentler gradient than the gradient at which the pre-correction operation movement amount linearly increases.

10. The image processing apparatus according to claim 1, further comprising:

a score calculation unit configured to calculate a score for each viewpoint position included in the recommended viewpoint information; and a recommended viewpoint selection unit configured to select one of viewpoint positions included in the recommended viewpoint information, based on the score, wherein the return movement amount calculation unit calculates the return movement amount for returning the viewpoint position corresponding to the display image to the viewpoint position selected from among the viewpoint positions included in the recommended viewpoint information.

11. The image processing apparatus according to claim 10, wherein the score calculation unit calculates the score, based on a distance between the viewpoint position included in the recommended viewpoint information and the viewpoint position corresponding to the display image.

12. The image processing apparatus according to claim 11, wherein the score calculation unit decreases a value of the score as the distance becomes longer.

13. The image processing apparatus according to claim 11, wherein the score calculation unit calculates the score by allocating a predetermined weight to the distance.

14. The image processing apparatus according to claim 13, wherein the score calculation unit increases the value of the score as the weight becomes larger, or decreases the value of the score as the weight becomes smaller.

15. The image processing apparatus according to claim 14,
wherein a larger value is assigned to the weight at a recommended viewpoint having a larger number of viewers.

16. The image processing apparatus according to claim 1,
wherein the return movement amount calculation unit calculates the return movement amount when the operation movement amount is equal to or smaller than a predetermined threshold.

17. An image processing method, implemented by a computer, the method comprising:
outputting part of an image including recommended viewpoint information as a display image to a display unit; and
causing a display range of the image to shift, based on a positional relationship between a viewpoint position corresponding to the display image output to the display unit and a viewpoint position corresponding to the recommended viewpoint information,
wherein the display range is caused to shift at a speed determined based on a difference in an angle of a line-of-sight direction from the viewpoint position corresponding to the recommended viewpoint information to the viewpoint position corresponding to the display image,
wherein the part of the image is output to the display unit based on the display range that has been made to shift,
wherein causing the display range of the image to shift includes:
calculating an operation movement amount for moving the viewpoint position corresponding to the display image in accordance with a viewpoint operation based on viewpoint operation information;
calculating a return movement amount for returning the viewpoint position corresponding to the display image to the viewpoint position corresponding to the recommended viewpoint information; and
calculating a viewpoint position of a next frame to be output after a frame of the display image output to the display unit, based on the operation movement amount and the return movement amount,
wherein the part of the image is output to the display unit, based on the display range determined from the viewpoint position of the next frame, and
wherein the return movement amount is calculated based on the difference in the angle of the line-of-sight direction from the viewpoint position corresponding to the recommended viewpoint information to the viewpoint position corresponding to the display image.

18. A non-transitory computer-readable storage medium having embodied thereon a program, which when executed by a computer causes the computer to perform a method, the method comprising:
outputting part of an image including recommended viewpoint information as a display image to a display unit; and
causing a display range of the image to shift, based on a positional relationship between a viewpoint position corresponding to the display image output to the display unit and a viewpoint position corresponding to the recommended viewpoint information,
wherein the display range is caused to shift at a speed determined based on a difference in an angle of a line-of-sight direction from the viewpoint position corresponding to the recommended viewpoint information to the viewpoint position corresponding to the display image,
wherein the part of the image is output to the display unit based on the display range that has been made to shift,
wherein causing the display range of the image to shift includes:
calculating an operation movement amount for moving the viewpoint position corresponding to the display image in accordance with a viewpoint operation based on viewpoint operation information;
calculating a return movement amount for returning the viewpoint position corresponding to the display image to the viewpoint position corresponding to the recommended viewpoint information; and
calculating a viewpoint position of a next frame to be output after a frame of the display image output to the display unit, based on the operation movement amount and the return movement amount,
wherein the part of the image is output to the display unit, based on the display range determined from the viewpoint position of the next frame, and
wherein the return movement amount is calculated based on the difference in the angle of the line-of-sight direction from the viewpoint position corresponding to the recommended viewpoint information to the viewpoint position corresponding to the display image.

* * * * *